(12) United States Patent  
Sogard

(10) Patent No.: US 6,864,601 B2  
(45) Date of Patent: Mar. 8, 2005

(54) ELECTRIC MOTORS WITH REDUCED STRAY MAGNETIC FIELDS

(75) Inventor: Michael R. Sogard, Menlo Park, CA (US)

(73) Assignee: Nikon Corporation (JP)

( * ) Notice: Subject to any disclaimer, the term of this patent is extended or adjusted under 35 U.S.C. 154(b) by 0 days.

(21) Appl. No.: 09/797,895

(22) Filed: Mar. 1, 2001

(65) Prior Publication Data

US 2004/0070285 A1 Apr. 15, 2004

(51) Int. Cl.$^7$ ............................................. H02K 41/00
(52) U.S. Cl. .............................................. 310/12; 355/53
(58) Field of Search ................................ 310/12, 13, 14; 33/1 M; 74/471 XY; 355/53, 72–76

(56) References Cited

U.S. PATENT DOCUMENTS

| | | | | |
|---|---|---|---|---|
| 4,560,911 A | * | 12/1985 | Chitayat | 318/135 |
| 5,084,644 A | * | 1/1992 | Harris et al. | 310/90.5 |
| RE34,674 E | | 7/1994 | Beakley et al. | 310/12 |
| 5,955,808 A | * | 9/1999 | Hill | 310/180 |
| 6,046,518 A | * | 4/2000 | Williams | 310/43 |
| 6,127,749 A | | 10/2000 | Sogard | 310/12 |
| 6,144,118 A | * | 11/2000 | Cahill et al. | 310/12 |
| 6,265,793 B1 | * | 7/2001 | Korenaga | 310/12 |
| 6,300,691 B1 | * | 10/2001 | Hwang et al. | 310/12 |
| 6,316,849 B1 | | 11/2001 | Konkola et al. | 310/12 |

* cited by examiner

*Primary Examiner*—Burton S. Mullins
*Assistant Examiner*—Judson H. Jones
(74) *Attorney, Agent, or Firm*—Steven G. Roeder; Jim Rose

(57) ABSTRACT

A linear electric motor (10) including a magnet component (12), a conductor component (14) that interacts with the magnet component (12) and a control system (15) for directing current to the conductor component (14) is provided herein. Uniquely, the conductor component (14) minimizes the total stray magnetic fields generated by the conductor component (14), without significantly influencing the dynamic performance of the motor (10). Because of the conductor component (14) provided herein, the motor (10) is particularly useful in manufacturing, measurement and/or inspection processes that are sensitive and/or influenced by stray AC magnetic fields. More specifically, the present invention is particularly useful with an exposure apparatus (18) that utilizes an illumination system (24) that generates a charged particle beam, such as an electron beam.

76 Claims, 22 Drawing Sheets

ELECTRIC MOTORS WITH REDUCED STRAY MAGNETIC FIELDS

FIELD OF THE INVENTION

The present invention is directed to linear electric motors. More specifically, the present invention is directed to a motor having reduced stray magnetic fields. The linear electric motor is particularly useful for moving a stage in a charged particle lithography, inspection and/or measurement tool.

BACKGROUND

Linear motors are used in a variety of electrical devices. For example, photolithography systems and other semiconductor processing equipment utlize linear motors to precisely position a reticle stage holding a reticle and a wafer stage holding a wafer. Alternately, linear motors are used in other devices, including elevators, machine tools, metal cutting machines, and inspection machines.

A typical brushless electric motor includes a magnet component and a conductor component The magnet component includes a plurality of permanent magnets positioned side-by-side. Each of the magnets generates a surrounding magnetic field. The conductor component includes one or more coils. When electric current flows in the coils, a Lorentz type force is created in a direction mutually perpendicular to the direction of the current in the coils and the magnetic field of the magnets. The force can be used to move one of the components relative to the other component of the motor.

A typical brushless linear electric motor generates stray magnetic fields external to the motor. Unfortunately, the stray magnetic fields can influence a number of manufacturing, measurement and/or inspection processes. For example, electron beams are influenced by AC magnetic fields of sufficient magnitude. As a result thereof, the AC linear electric motors must be positioned a relatively large distance away from the electron beam, typically outside a system magnetic shield. More specifically, for an electron beam projection lithography system, the linear motors used to position the reticle stage and the wafer stage must be positioned a relatively large distance away from the electron beam. Similar design considerations apply to other charged particle lithography systems, including both electron and ion beam systems, as well as charged particle inspection or metrology systems.

In order to increase the performance of electron beam lithography systems, it is necessary to integrate the electric motors directly into the reticle stage and the wafer stage. This means the motors must be positioned within the magnetic shield and close to the electron beam. As a result thereof, the stray AC magnetic fields from the motors present a problem.

One attempt to solve this problem includes adding one or more additional magnetic shields that block the stray AC magnetic fields from the motor. Unfortunately, the magnetic shields will require a sizable opening to allow for movement of the moving part of the motor. Further, the magnetic shields can increase the required size of the stage and the motor. This increases the size and weight of the entire machine.

In light of the above, there is a need for a conductor component and an electric motor that has reduced stray magnetic fields, without significantly influencing the dynamic performance of the motor. Further, there is a need for a brushless electric motor for an exposure apparatus that utilizes a charged particle beam. Moreover, there is a need for an improved motor for precisely positioning a device during a manufacturing, measurement and/or an inspection process. Additionally, there is a need for an exposure apparatus capable of manufacturing precision devices, such as high density, semiconductor wafers.

SUMMARY

The present invention is directed to an electric motor and a conductor component that satisfies these objects. The electric motor includes a magnet component and a control system in addition to the conductor component. The magnet component includes one or more magnet arrays. Each of the magnet arrays includes one or more magnets that generate surrounding magnetic fields. The conductor component includes a first conductor group having a first conductor array and a second conductor array that interact with the magnet component to move one of the components relative to the other component of the electric motor. More specifically, the control system directs electric current to each of the conductor arrays of the first conductor group. When electric current flows in the conductor arrays, a Lorentz force is generated that is used to move one of the components relative to the other component of the electric motor.

Uniquely, current is directed through each of the conductor arrays in opposite directions. With this design, the second conductor array generates a second stray magnetic field that interacts with a first stray magnetic field and cancels and/or reduces at least a portion of the first stray magnetic field. As a result of this design, the magnitude of the overall stray magnetic field of the electric motor is reduced. Thus, the motor provided herein is particularly useful in manufacturing, measurement and/or inspection processes that are sensitive to and/or influenced by stray AC magnetic fields.

As provided herein, the magnet component and the conductor component are designed so that when the conductor arrays of the first conductor group are energized by the control system, each of the conductor arrays is positioned in magnetic fields pointing in the opposite directions. More specifically, the first conductor array will typically lie within the magnetic fields from several magnets. The second conductor array is positioned relative to the magnet component so that the second conductor array encounters magnetic fields whose polarities are opposite to those encountered by the first conductor array. As a result of this design, a first force created by the electrically excited first conductor array and a second force created by the electrically excited second conductor array are in the same direction and are used to move one of the components relative to the other component.

In summary, because the current is opposite in the conductor arrays, the electrically excited second conductor array generates the time dependent second magnetic field that cancels and or reduces the time dependent first stray magnetic field generated by the electrically excited first conductor array. Further, the motor architecture and coil location are such that when the conductor arrays are energized to provide a net force, each conductor array finds itself in a magnetic field environment which is opposite in polarity.

The present invention is also directed to a stage assembly an exposure apparatus, a device and a semiconductor wafer.

Further the present invention is also directed to a method for manufacturing a brushless electric motor, a stage assembly, an exposure apparatus and a method for making a device and semiconductor wafer utilizing the exposure apparatus

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Referring initially to FIGS. 1A–1E, a linear brushless electric motor 10 having features of the present invention includes a magnet component 12, a conductor component 14 that interacts with the magnet component 12 and a control system 15 for directing current to the conductor component 14. The conductor component 14 is uniquely designed to reduce the magnitude of the time dependent stray magnetic fields generated by the electric motor 10, without significantly influencing the dynamic performance of the motor 10.

Figure 16:
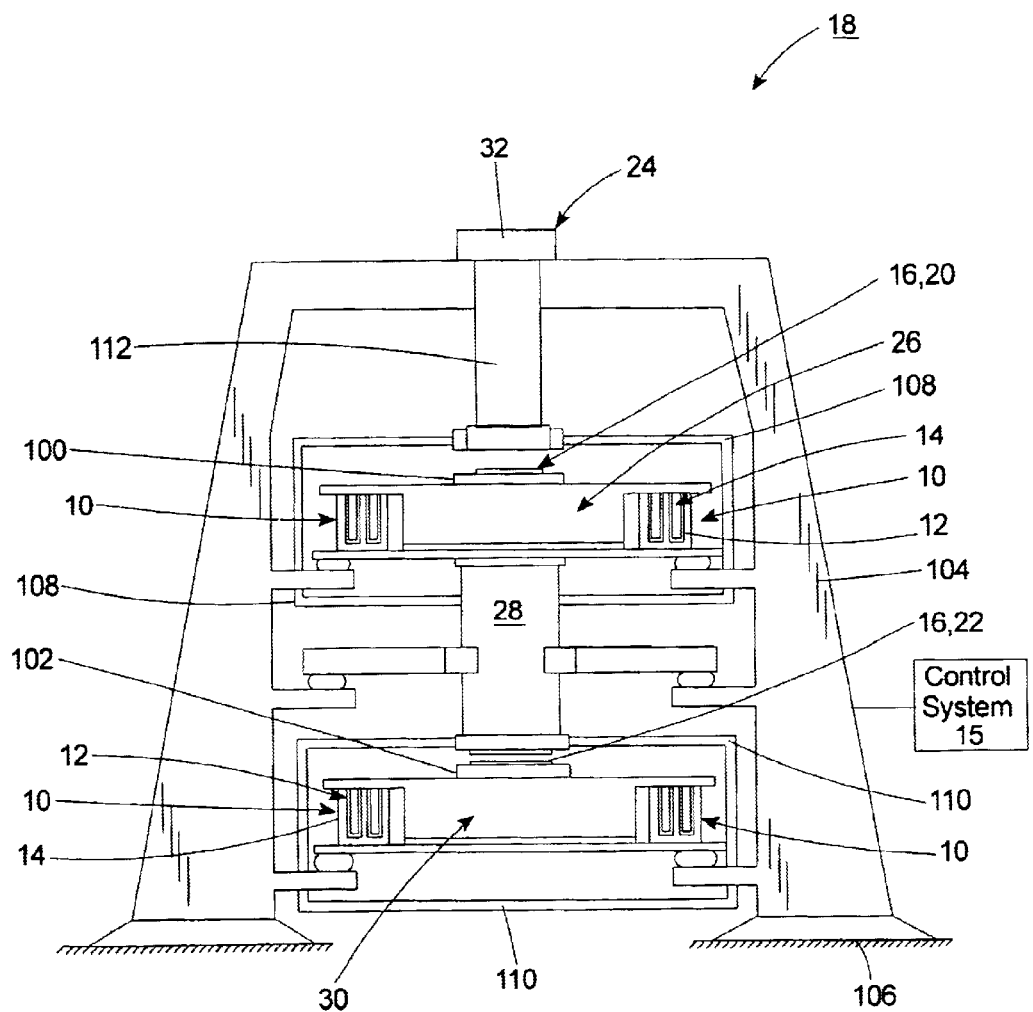
FIG. 16 is a side illustration of an exposure apparatus utilizing a plurality of motors having features of the present invention.

The motor 10 is particularly useful for precisely positioning a device 16 (illustrated in FIG. 16) during a manufacturing, measurement and/or an inspection process. The type of device 16 positioned and moved by the motor 10 can be varied. For example, as illustrated in FIG. 16, multiple motors 10 can be used in an exposure apparatus 18 for precisely positioning a reticle 20 and a semiconductor wafer 22 during manufacturing of the semiconductor wafer 22. Alternately, for example, one or more motors 10 can be used to move other types of devices during manufacturing, measurement and/or inspection.

Because of the conductor component 14 provided herein, the motor 10 is particularly useful in manufacturing, measurement and/or inspection processes that are sensitive to and/or influenced by stray AC magnetic fields. As illustrated in FIG. 16, a typical charged particle exposure apparatus 18 includes an illumination system 24, a reticle stage assembly 26, an optical assembly 28 and a wafer stage assembly 30. The illumination system 24 includes an illumination source 32 (illustrated in FIG. 16) that generates a beam of charged particles (not shown). One type of illumination source 32 is an electron beam generator that generates an electron beam. An electron beam can be influenced by AC magnetic fields of sufficient magnitude. Thus, minimizing the AC stray magnetic fields is an important consideration in an electron beam lithography, inspection, or metrology system.

It should be understood that DC magnetic fields, below some maximum intensity, do not perturb a charged particle beam in operation. The effects of the DC magnetic field on the charged particle beam can be corrected or compensated for during the initial alignment procedure for the electron beam prior to operation. Only if the DC magnetic field is so strong that the initial alignment procedure is affected does it become a problem. Typically, the tolerable DC magnetic field can exceed the tolerable AC magnetic field by several orders of magnitude. Thus, the present invention is particularly useful for AC motors 10.

Figure 3A:
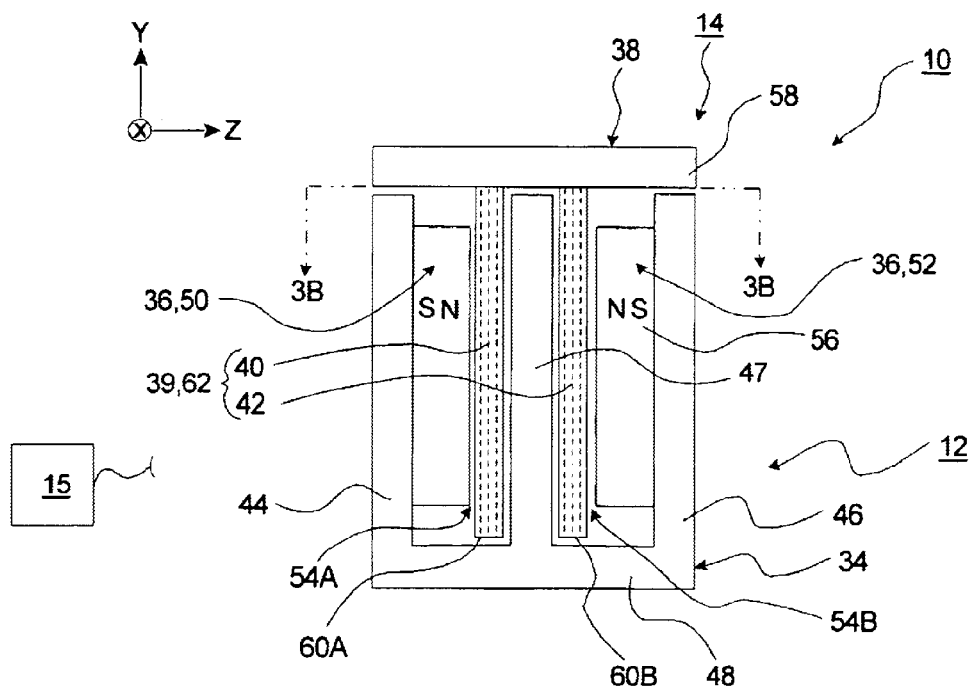
FIG. 3A is an end view of a third embodiment of a linear motor having features of the present invention.
Figure 3B:
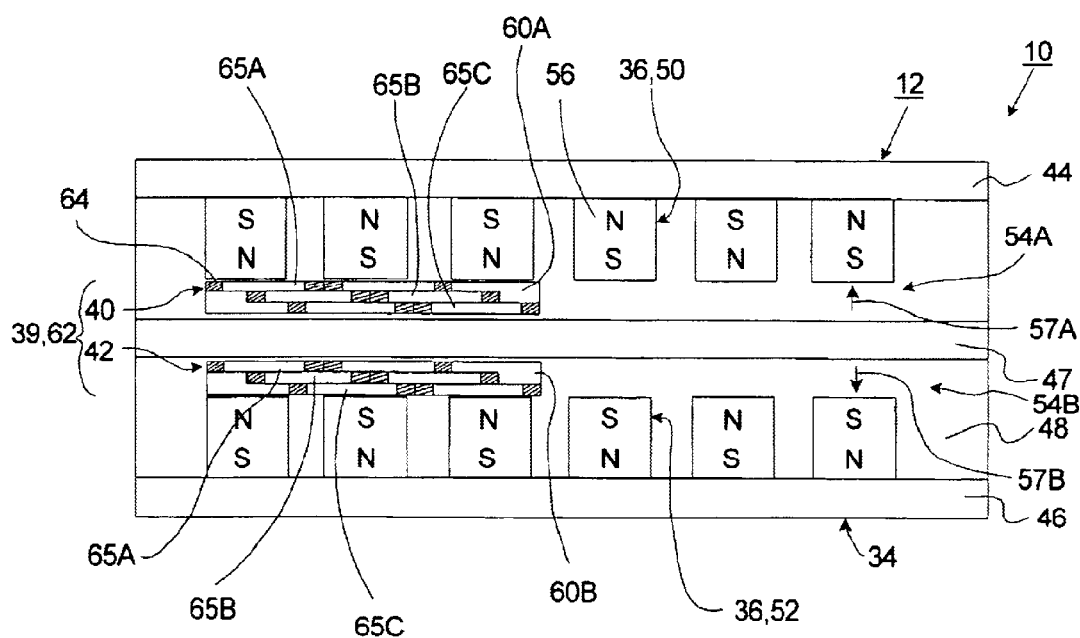
FIG. 3B is a cut-away view taken on line 3B—3B in FIG. 3A.
Figure 4A:
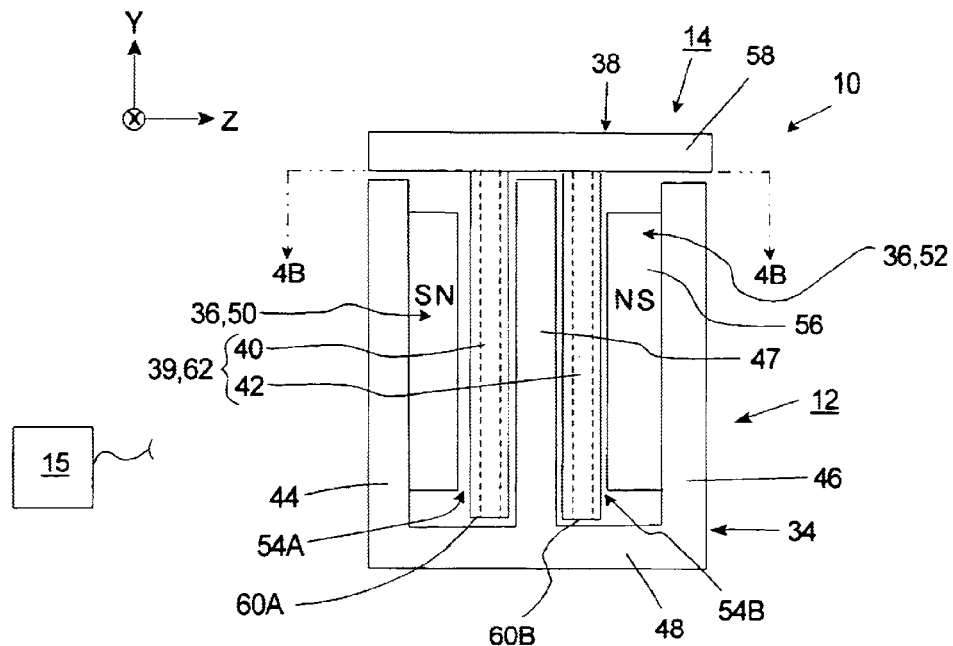
FIG. 4A is an end view of fourth embodiment of a linear motor having features of the present invention.
Figure 4B:
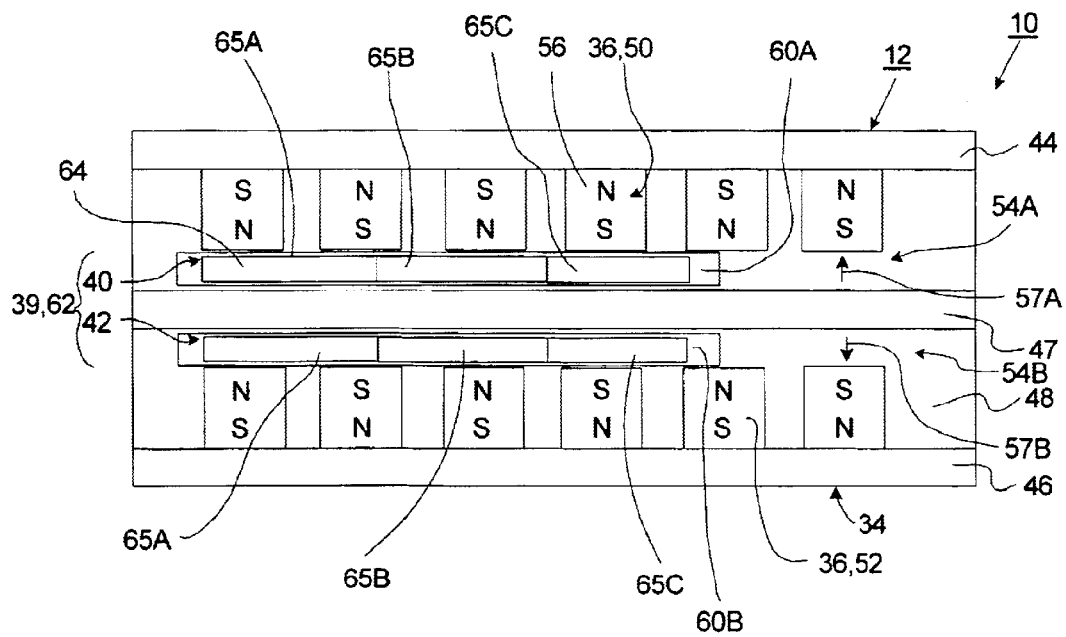
FIG. 4B is a cut-away view taken on line 4B—4B in FIG. 4A.
Figure 5A:
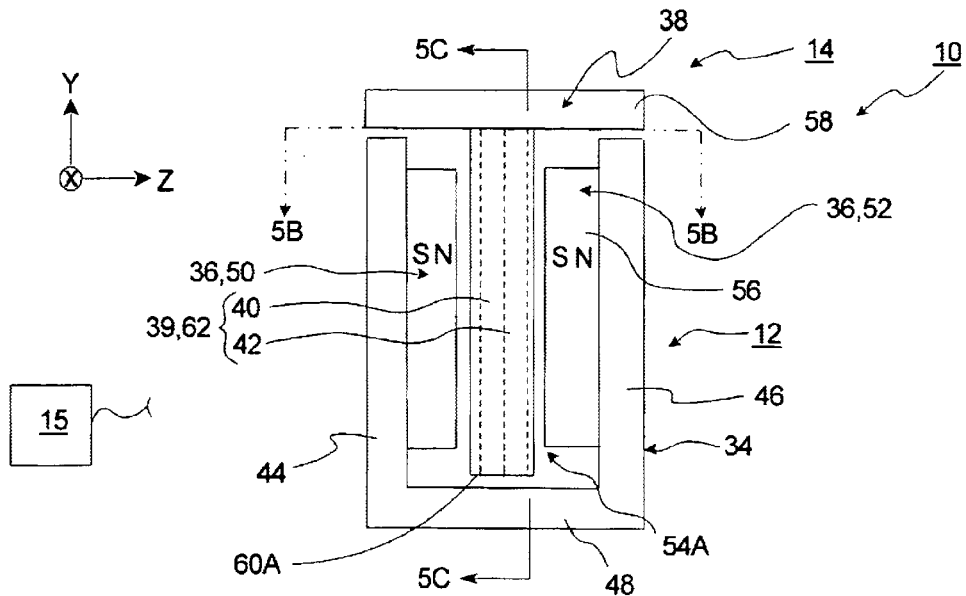
FIG. 5A is an end view of a fifth embodiment of a linear motor having features of the present invention.
Figure 5B:
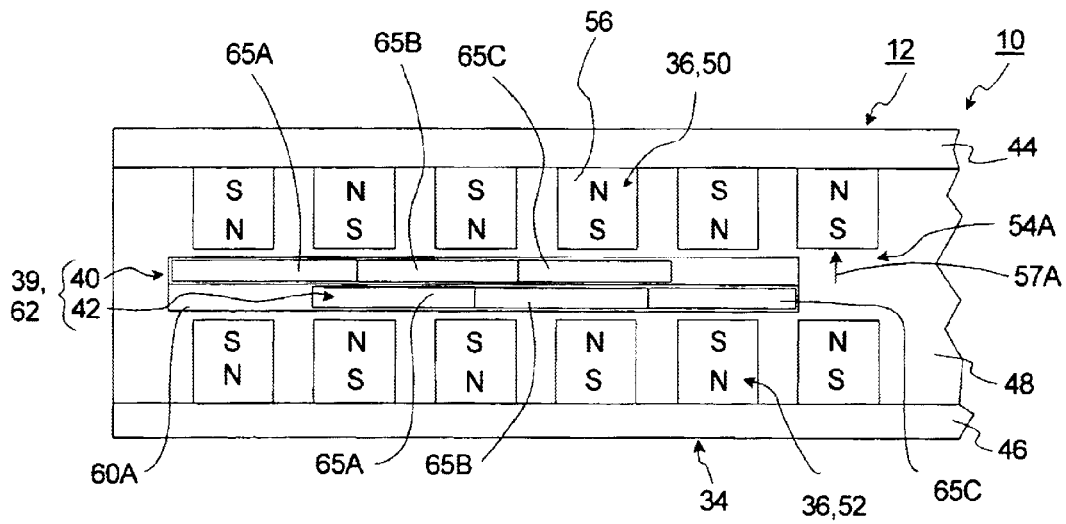
FIG. 5B is a cut-away view taken on line 5B—5B in FIG. 5A.
Figure 5C:
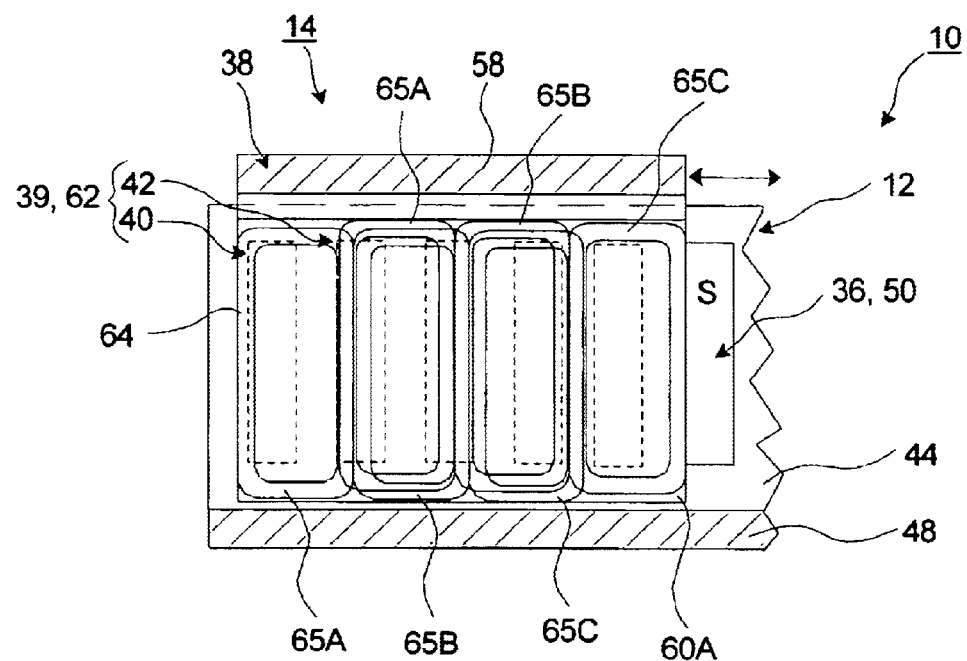
FIG. 5C is a cut-away view taken on line 5C—5C in FIG. 5A.
Figure 6A:
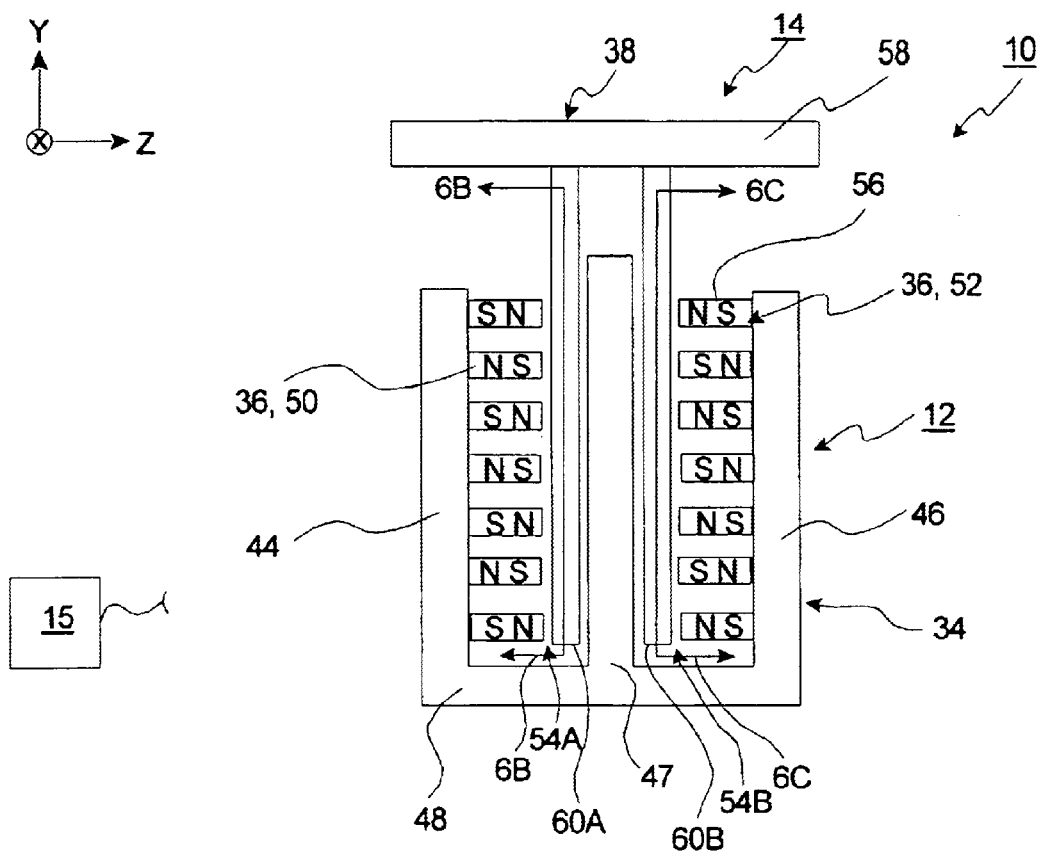
FIG. 6A is an end view of a sixth embodiment of a linear motor having features of the present invention.
Figure 6B:
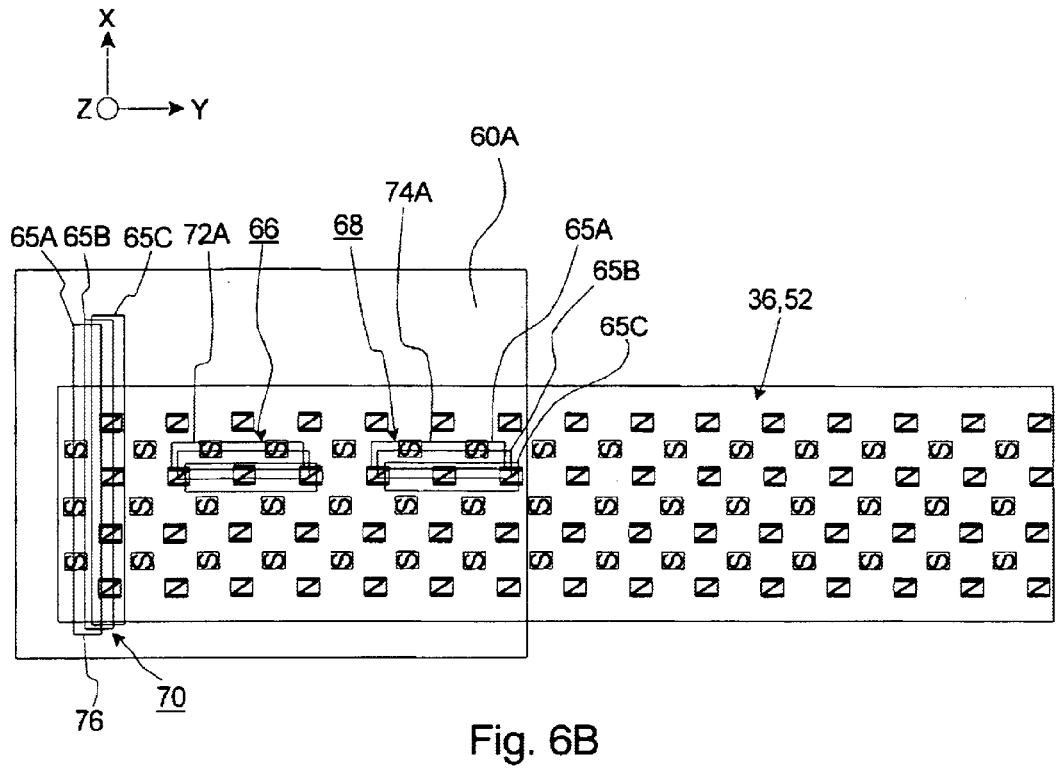
FIG. 6B is a cut-away view taken on line 6B—6B of FIG. 6A.
Figure 6C:
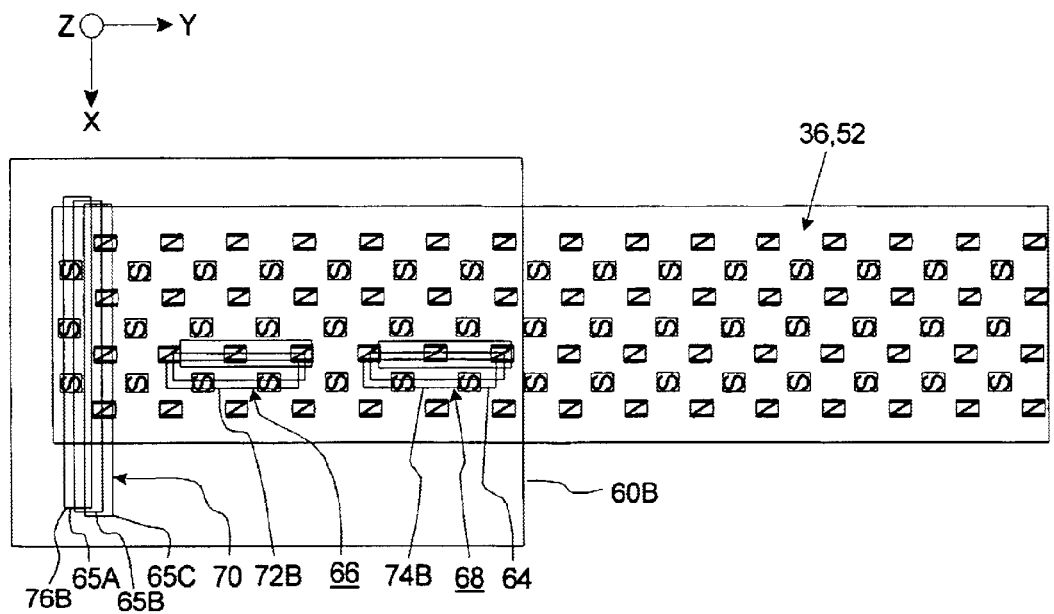
FIG. 6C is a cut-away view taken on line 6C—6C in FIG. 6A.
Figure 7A:
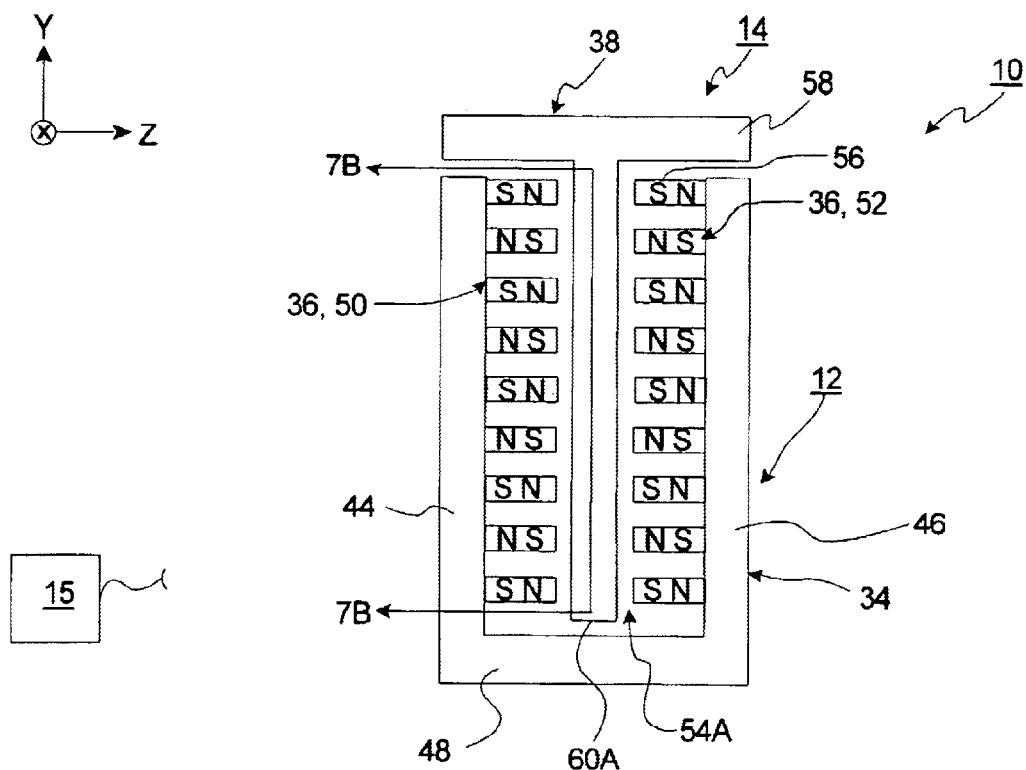
FIG. 7A is an end view of a seventh embodiment of a linear motor having features of the present invention.
Figure 7B:
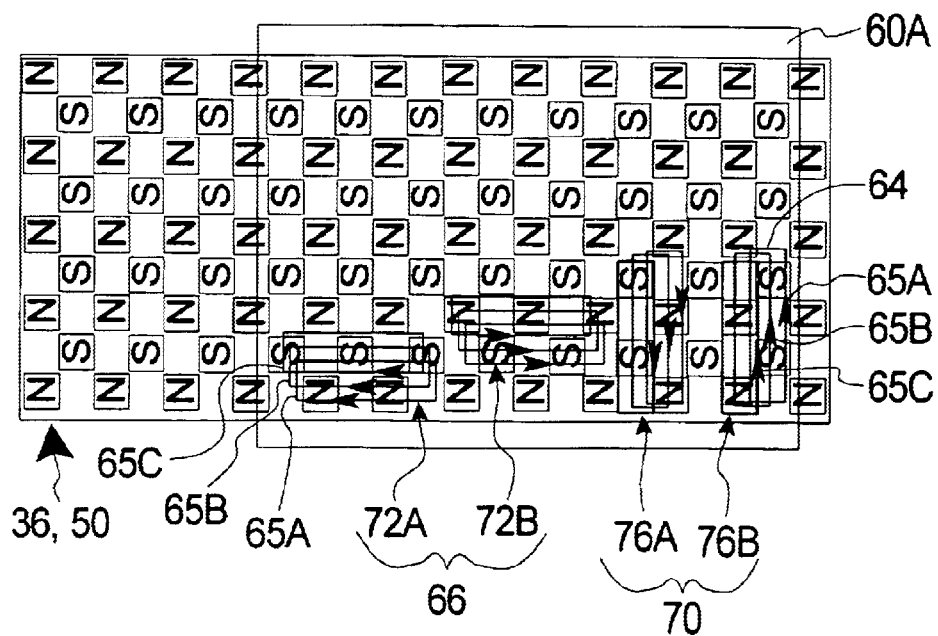
FIG. 7B is a cut-away view taken on line 7B—7B of FIG. 7A.

A number of alternate embodiments of the motor 10 are illustrated in the Figures. In particular, FIGS. 1A–1E illustrate a first embodiment of the motor 10, FIGS. 2A–2D illustrate a second embodiment of the motor 10, FIGS. 3A and 3B illustrate a third embodiment of the motor 10, FIGS. 4A and 4B illustrate a fourth embodiment of the motor 10, FIGS. 5A–5C illustrate a fifth embodiment of the motor 10, FIGS. 6A–6C illustrate a sixth embodiment of the motor 10, and FIGS. 7A and 7B illustrate a seventh embodiment of the motor 10.

In each embodiment, the conductor component 14 is uniquely designed to reduce the total stray magnetic fields from the conductor component 14. Preferably, during activation of the motor 10, the conductor component 14 of the motor 10 effectively does not generate magnetic fields that perturb the electron beam. As a result of thereof, one or more brushless linear motors 10 made in accordance with the present invention can be placed relatively close to the electron beam. Because, the one or more motors 10 can be placed close to the electron beam, the motors 10 can be integrated into one or both of the stage assemblies 26, 30, and the size of the stage assemblies 26, 30 can be reduced. With this design, smaller motors 10 can be used, and the motors 10 can more accurately position the device 16. Further, the exposure apparatus 18 is capable of manufacturing higher precision devices 16, such as higher density, semiconductor wafers 22. In addition, higher device 16 throughputs may be achieved.

Further, in the embodiments illustrated herein, the conductor component 14 is designed to move relative to magnet component 12. Alternately, for example, the motor 10 could be designed so that the magnet component 12 moves relative to the conductor component 14. Stated another way, the object to be moved by the motor 10 could be attached to the magnet component 12, and the conductor component 14 could be attached to an unmoving structure. While the present invention would continue to function successfully by significantly reducing the AC magnetic field from the conductor component 14, the moving magnet component 12 would effectively generate a time varying magnetic field from the moving magnets that could perturb a charged particle beam.

A number of the Figures include a coordinate system that designates an X axis, a Y axis, and a Z axis. It should be understood that the coordinate system is merely for reference and can be varied. For example, the X axis can be switched with the Y axis and/or the motor 10 can be rotated. Additionally, some of the Figures include (i) the symbol "+" and/or "N" that represents the North pole of a permanent magnet and (ii) the symbol "−" and/or "S" that represents the South pole of a permanent magnet.

As an overview, in each embodiment illustrated herein, the magnet component 12 includes a magnet component housing 34 and one or more magnet arrays 36, and the conductor component 14 includes a conductor component housing 38 and one or more conductor groups 39. Further, each of the conductor groups 39 includes at least a first conductor array 40 and a second conductor array 42 that cooperate to drive the conductor component 14 when electrically excited. As provided herein, the conductor arrays 40, 42 of each conductor group 39 are uniquely positioned, designed and controlled to reduce and minimize stray magnetic fields when the conductor arrays 40, 42 are electrically excited.

If the motor 10 is used in a charged particle exposure apparatus 18, it will likely operate within a vacuum environment required by the charged particle beam. In that event, the components of the motor 10 must be vacuum compatible, and the components must be constructed and assembled using vacuum compatible materials and procedures The design of the magnet component housing 34 can be varied to suit the design requirements of the motor 10. A number of embodiments of the magnet component housings 34 are provided herein. For example, in the embodiment illustrated in the FIGS. 1A–1E, the magnet component housing 34 is somewhat "W" shaped and includes a first wall 44, a second wall 46, an intermediate wall 47 and a separator 48 that are secured together. Each of the walls 44, 46, 47 is generally planar shaped. The separator 48 retains and maintains the walls 44, 46, 47 spaced apart, generally parallel and with the intermediate wall 47 positioned between the first wall 44 and the second wall 46. Further, each of the walls 44, 46, 47 cantilevers substantially perpendicularly from the separator 48.

Preferably, the walls 44, 46, 47 are made of a highly magnetically permeable material, such as a soft iron. The magnetically permeable material provides some shielding of the magnetic fields generated by the motor 10, as well as providing a low reluctance magnetic flux return path for the magnetic fields generated by the magnet arrays 36.

The number of magnet arrays 36 in the motor 10 can be varied. For example, in the embodiment illustrated in the FIGS. 1A–1E, the motor 10 includes a first magnet array 50, a second magnet array 52, a first intermediate magnet array 53A, and a second intermediate magnet array 53B. The first magnet array 50 is secured to the right side of the first wall 44, the second magnet array 52 is secured to the left side of the second wall 46, the first intermediate magnet array 53A is secured to the left side of the intermediate wall 47 and the second intermediate magnet array 53B is secured to the right side of the intermediate wall 47. The first magnet array 50 and the first intermediate magnet array 53A are spaced apart by a first magnet gap 54A. Similarly, the second magnet array 52 and the second intermediate magnet array 53B are spaced apart by a second magnet gap 54B.

Each of the magnet arrays 36 includes one or more magnets 56. The design, the positioning, and the number of magnets 56 in each magnet array 36 can be varied to suit the design requirements of the motor 10. In the embodiment illustrated in FIGS. 1A–1E, each magnet array 36 includes six (6), rectangular shaped magnets 56 that are aligned side-by-side linearly along the respective wall 44, 46, 47. Further, in the embodiment illustrated In FIGS. 1A–1E, the magnets 56 in each magnet array 36 are orientated so that the poles facing the first magnet gap 54A and the second magnet gap 54B alternate between the North pole and the South pole Stated another way, the magnets 56 in each magnet array 36 are preferably arranged with alternating magnetic polarities. The magnets 56 are spaced periodically. The repeat distance is referred to as the magnet pitch.

Further, the polarity of the pole facing the first magnet gap 54A of each of the magnets 56 in the first magnet array 50 is opposite from the polarity of the pole of the corresponding magnet 56 in the first intermediate magnet array 53A. In other words, North pole faces South pole across the gap 54A. Similarly, the polarity of the pole facing the second magnet gap 54B of each of the magnets 56 in the second magnet array 52 is opposite from the polarity of the pole of the corresponding magnet 56 in the second intermediate magnet array 53B. In other words, North pole faces South pole across the gap 54B. This leads to strong magnetic fields in the first magnet gap 54A and in the second magnet gap 54B and strong force generation capability of the motor 10.

Figure 1A:
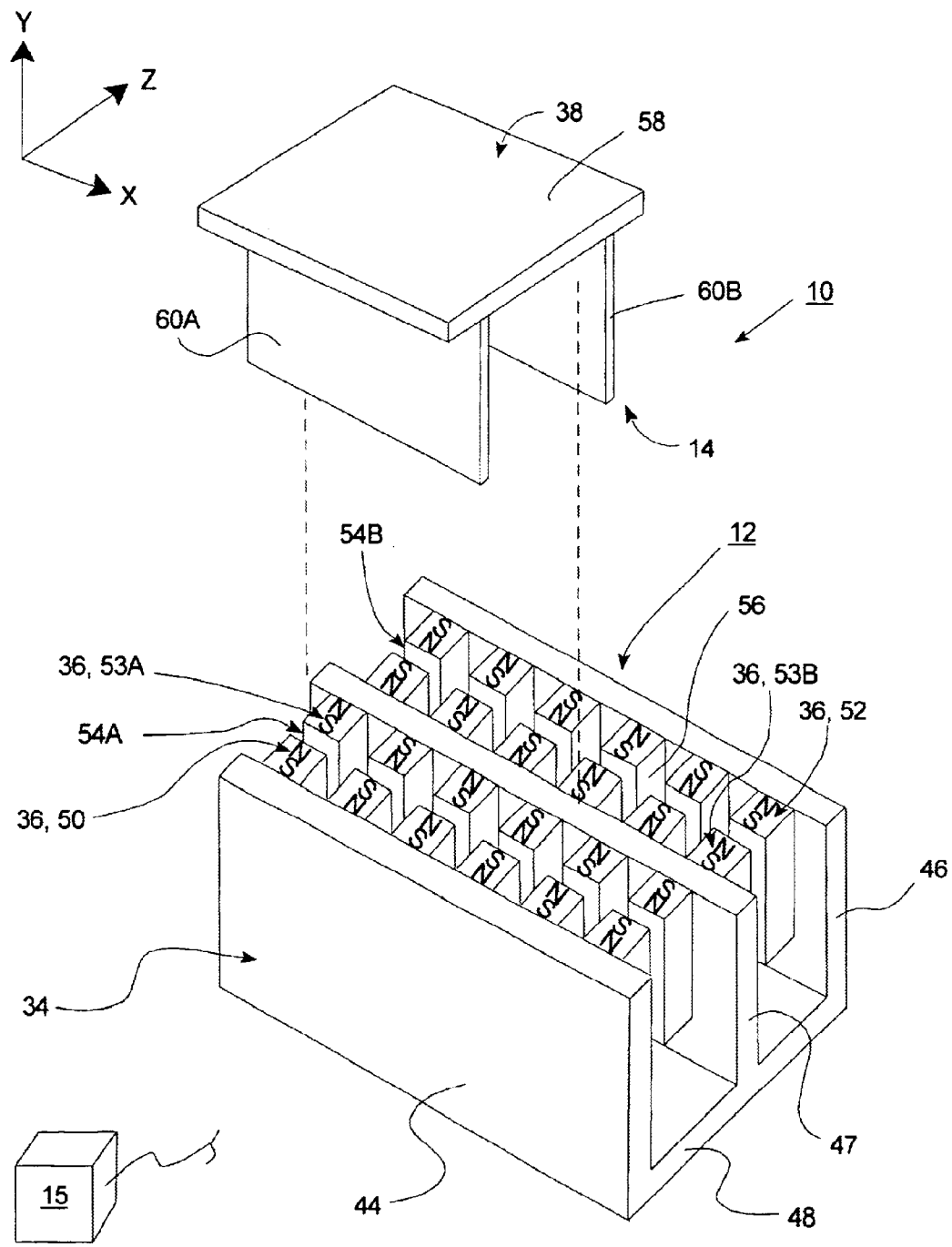
FIG. 1A is an exploded perspective view of a first embodiment of a linear motor having features of the present invention.
Figure 1B:
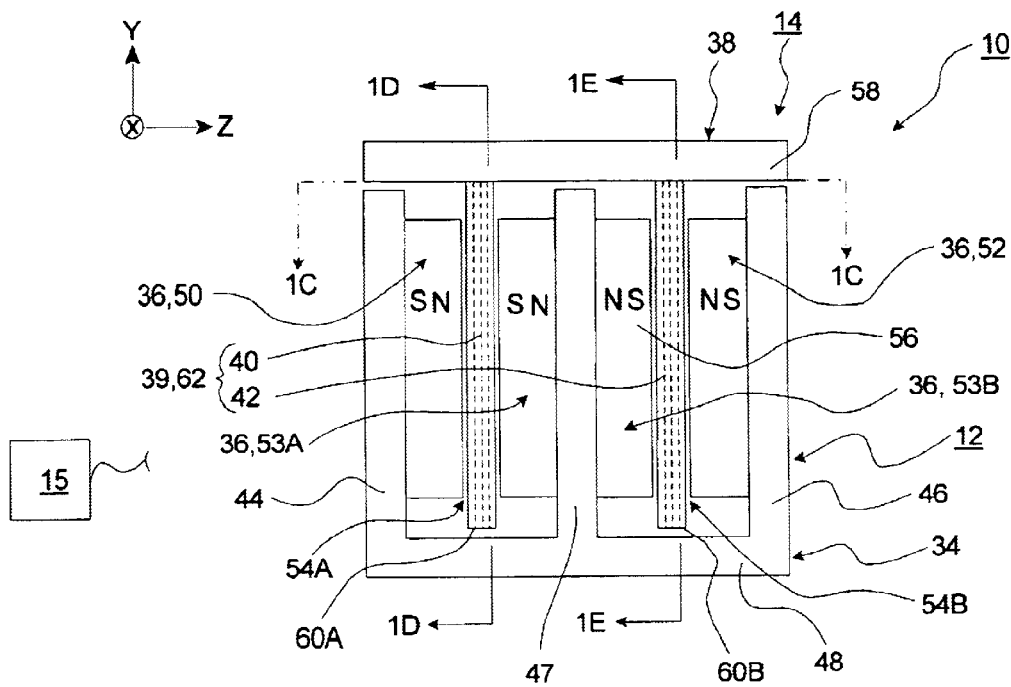
FIG. 1B is an end view of the linear motor of FIG. 1A.
Figure 1C:
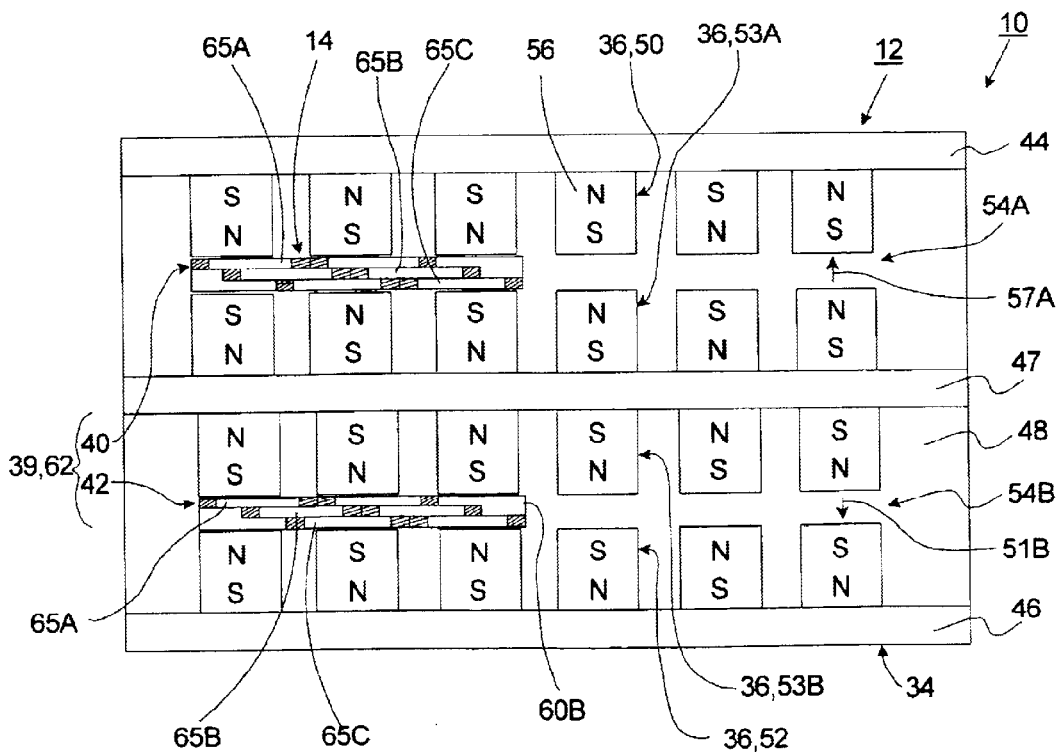
FIG. 1C is a cut-away view taken on lines 1C—1C in FIG. 1B.

Importantly, referring to FIG. 1C, the polarities of corresponding magnets 56 in the first intermediate magnet array 53A and the second intermediate magnet array 53B are opposite. As a result of this design, the corresponding alternating magnetic fields 57A in the first magnet gap 54A and the alternating magnetic fields 57B in the second magnet gap 54B are opposite in direction. Only a portion of the magnetic fields 57A, 57B is represented in FIG. 1C as an arrows. Stated another way, the magnetic fluxes in the first magnet gap 54A are opposite in direction from the magnetic flux in the second magnet gap 54B immediately adjacent to it for corresponding magnet locations in the magnet arrays.

Within each magnet gap each of the magnets 56 generates a surrounding magnetic field of preferably equal magnitude. The magnitude of the magnetic fields in the first magnet gap need not be equal to the magnitude of the magnetic fields in the second magnet gap. However, in the embodiments explicitly considered herein, the magnitudes of the magnetic fields in the first magnet gap 54A and the second magnet 54B gap are assumed to be substantially equal. Further, each of the magnets 56 is preferably made of a high energy product, rare earth, permanent magnetic material such as NdFeB. Alternately, for example, each magnet 56 can be made of a low energy product, ceramic or other type of material that is surrounded by a magnetic field.

The design of the conductor component 14 can be varied to suit the design requirements of the motor 10. The present invention provides a number of alternative embodiments of the conductor component 14. As an overview, FIGS. 1A–1E illustrate a first embodiment of the conductor component 14, FIGS. 2A–2D illustrate a second embodiment of the conductor component 14, FIGS. 3A and 3B illustrate a third embodiment of the conductor component 14, FIGS. 4A and 4B illustrate a fourth embodiment of the conductor component 14, FIGS. 5A–5C illustrate a fifth embodiment of the conductor component 14, FIGS. 6A–6C illustrate a sixth embodiment of the conductor component 14, and FIGS. 7A and 7B illustrate a seventh embodiment of the conductor component 14. As provided above, in each embodiment, the conductor component 14 includes the conductor component housing 38 and one or more conductor groups 39.

The design of the conductor component housing 38 can be varied to suit the design requirements of the motor 10. In the embodiment illustrated in FIGS. 1A–1E, the conductor component housing 38 includes an attachment section 58, a first conductor section 60A and a second conductor section 60B. The attachment section 58 extends across the magnet component 12 and secures the conductor component 14 to the object to be moved by the motor 10. The attachment section 58 maintains the conductor sections 60A, 60B spaced apart and generally parallel.

In the embodiment illustrated in FIGS. 1A–1E, each of the sections 58, 60A, 60B is generally rectangular shaped. Further, in the embodiment illustrated in FIGS. 1A–1E, the attachment section 58 extends substantially horizontally along the X axis and the Z axis and each of the conductor sections 60A, 60B extends vertically downward along the Y axis from the attachment section 58, substantially perpendicular to the attachment section 58.

The design and number of conductor groups 39 in the conductor component 14 depends upon the design requirements of the motor 10 and the movement requirements of the motor 10. As provided above, each of the conductor groups 39 includes at least the first conductor array 40 and the second conductor array 42 that drive the conductor component 14 when electrically excited. The conductor arrays 40, 42 of each conductor group 39 are uniquely positioned, designed and controlled to reduce stray magnetic fields when the conductor arrays 40, 42 are electrically excited. Preferably, the conductor arrays 40, 42 of each conductor group 39 are positioned in close proximity.

For each conductor group 39, the electrically excited second conductor array 42 reduces the magnitude and/or strength of a first stray magnetic field generated from the electrically excited first conductor array 40. Similarly, for each conductor group 39, the electrically excited first conductor array 40 reduces the magnitude and/or strength of a second stray magnetic field generated from the electrically excited second conductor array 42. Stated another way, the electrically excited second conductor array 42 generates the second magnetic field that cancels and/or reduces the first stray magnetic field generated by the electrically first conductor array 40. The embodiments provided herein illustrate a number of possible examples of one or more conductor groups 39. Those skilled in the art will recognize that other designs are possible with the teaching provided herein.

In FIGS. 1A–1E, the conductor component 14 includes a first conductor group 62 that moves the conductor component 14 relative to the magnet component 12 along the X axis. More specifically, the first conductor array 40 and the second conductor array 42 of the first conductor group 62, when electrically excited, cooperate to concurrently move the conductor component 14 relative to the magnet component 12 along the X axis.

Importantly, the conductor arrays 40, 42 of the first conductor group 62 are positioned and controlled to reduce stray magnetic fields generated by the conductor component 14 when the conductor arrays 40, 42 are electrically excited. Stated another way, for the first conductor group 62, the electrically excited second conductor array 42 generates the second stray magnetic field that cancels and/or reduces the first stray magnetic field generated by the electrically first conductor array 40.

Referring to FIGS. 1B–1E, for the first conductor group 62, the first conductor array 40 is embedded and positioned within the first conductor section 60A and the second conductor array 42 is embedded and positioned within the second conductor section 60B. Stated another way, for the first conductor group 62, (i) the first conductor section 60A retains the first conductor array 40 in the first magnet gap 54A, and (ii) the second conductor section 60B retains the second conductor array 42 in the second magnet gap 54B. With this design, (i) the first conductor section 60A and the first conductor array 40 move within the first magnet gap 54A between the first magnet array 50 and the first intermediate magnet array 53A and the (ii) the second conductor section 60B and the second conductor array 42 move within the second magnet gap 54B between the second magnet array 52 and the second intermediate magnet array 53B. It should also be noted that the conductor arrays 40, 42 of the first conductor group 62 are attached together, move concurrently, and are parallel.

As a result of this design, (i) the first conductor array 40 is immersed in the magnetic fields 57A from magnet arrays 50, 53A, and (ii) the second conductor array 42 is immersed in the magnetic fields 57B from magnet arrays 52, 53B. As discussed above, the alternating magnetic fields 57A in the first magnetic gap 54A are substantially opposite in polarity from the alternating magnetic fields 57B in the second magnetic gap 54B, for corresponding magnet locations in the two conductor arrays. With this design, when the conductor arrays 40, 42 of the first conductor group 62 are energized, corresponding parts of each of the conductor arrays 40, 42 are positioned in magnetic fields pointing in the opposite directions.

Each of the conductor arrays 40, 42 preferably includes one or more coils 64 or other type of conductor. Further, the design of the first conductor array 40 can differ from the design of the second conductor array 42 for each conductor group 39. For example, the coil geometries may be different, or the number of windings in the coils may be different. Such differences will generally affect the relative magnitudes of currents in the two conductor arrays, which provide for optimum stray magnetic field reduction. In the embodiments explicitly described herein, the first conductor array and the second conductor array are assumed to be substantially identical. Each of the coils 64 may be excited by different electrical phases, and may be displaced relative to one another along the axis of motion of the motor 10. More phases are theoretically more efficient. However, each additional phase complicates timing of the signals to the various phases.

Figure 1D:
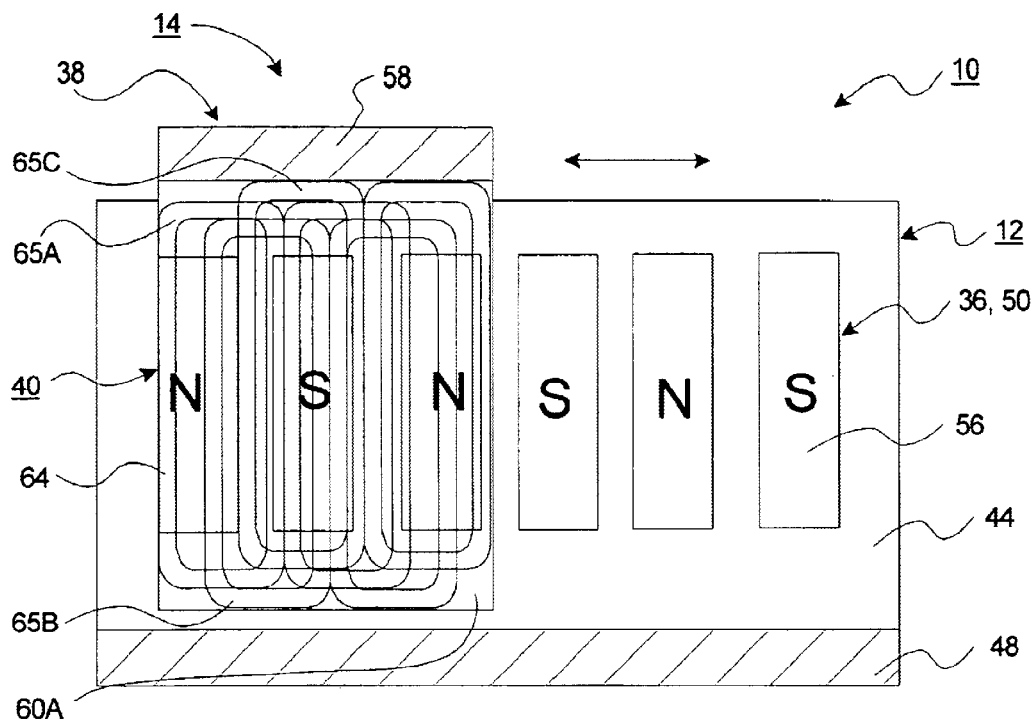
FIG. 1D is a cut-away view taken on line 1D—1D in FIG. 1B.
Figure 1E:
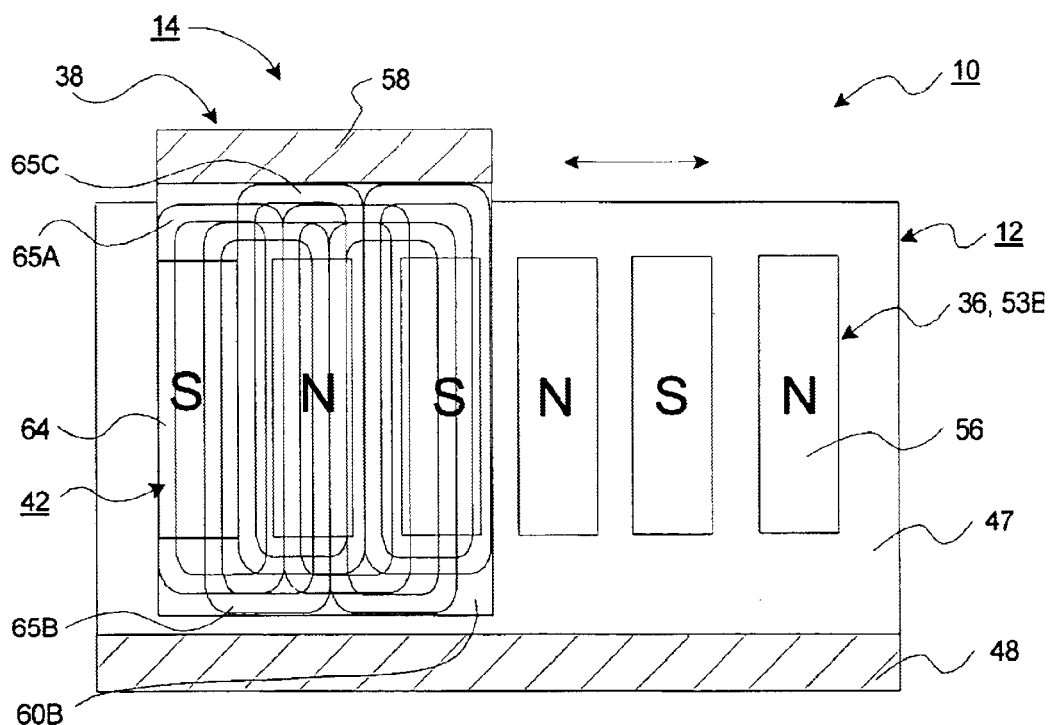
FIG. 1E is a cut-away view taken on line 1E—1E in FIG. 1B.

Referring to FIGS. 1C–1E, each conductor array 40, 42 is designed for a three phase AC motor 10 and Includes a first phase 65A of coils, a second phase 65B of coils and a third phase 65C of coils. Stated another way, each phase 65A, 65B, 65C of the first conductor array 40 includes a plurality of electrical wires that are wrapped into a plurality of coils 64 that extends linearly within the first conductor section 60A of the conductor component 14. Similarly, each phase 65A, 65B, 65C of the second conductor array 42 includes a plurality of electrical wires that are wrapped Into a plurality of coils 64 that extends linearly within the second conductor section 60B of the conductor component 14.

For each of the conductor arrays 40, 42, the coil phases 65A, 65B, 65C are staggered in the direction of linear motion. More specifically, the second coil phase 65B is spaced a distance (n+⅓)p from the first coil phase 65A, and the third coil phase 65C is spaced apart a distance (n+⅔)p from first coil phase 65A. In this equation, "p" is the magnet pitch and "n" is an integer. Normally, n is equal to zero (n=0). The electrical wires can be made of metal Such as copper or any substance or material capable of carrying electrical current.

The number of coils 64 applied to each electrical phase 65A, 65B, 65C can be varied. In the embodiment illustrated in FIGS. 1C–1E, each phase 65A, 65B, 65C includes a plurality of electrical wires that are wrapped into an assembly of two coils 64. These coils 64 are periodic with a periodicity equal to (2n+1)p. The coils 64 of each phase 65A, 65B, 65C are wired in series. It should be noted that the phases 65A, 65B, 65C of each coil array 40, 42 are illustrated in the Figures as being offset laterally for clarity. In use, the phases of each coil array 40, 42 are preferably not laterally offset. Moreover the phases 65A, 65B, and 65C are illustrated in FIGS. 1C and 3B as being offset vertically. This is done partly for figure clarity and partly to simplify coil construction. However, higher motor efficiency can be achieved, if the coils all lie in the same vertical plane and occupy most of the available magnet gap. This geometry requires that the ends of the coils not lying within the magnet gap are suitably folded out of the median plane of the coils, so that the coils from the different phases don't interfere with one another. This geometry is taught in U.S. Pat. No. 4,839,543, reissued as Re Pat. No. 34,674.

The control system 15 directs and controls the electrical current to the conductor component 14 to control movement of one of the components 12, 14 relative to the other component 14, 12. For each conductor group 39, the control system 15 independently directs current to each of the conductor arrays 40, 42. More specifically, in the embodiment illustrated in FIGS. 1A–1E, the control system 15 independently directs current to each phase 65A, 65B, 65C in each of the conductor arrays 40, 42 of the first conductor group 62. Stated another way, in the multi-phase motor 10, each of the phases 65A, 65B, 65C of each of the conductor arrays 40, 42 is selectively driven with electric current.

The electrical currents in the first conductor array 40 interact with the magnetic fields that surround the magnets 56 in the first magnet gap 54A. When electric currents flow in the wires of the coils 64 of the first conductor array 40, Lorentz type forces are generated in a direction mutually perpendicular to the direction of the wires of the coils 64 of the first conductor array 40 and the magnetic fields in the first magnet gap 54A. If the current magnitudes and polarities are adjusted properly to the alternating polarity of the magnet fields of the magnets 56 in the first magnet gap 54A, based on the relative position of the first conductor array 40, a controllable first force on the first conductor array 40 is generated.

More specifically, for the first conductor array 40, the control system 15 independently adjusts current to each phase 65A, 65B, 65C based upon which coils of the phases 65A, 65B, 65C are optimally positioned relative to the magnetic fields in the first magnet gap 54A. For example, if the coils of the first phase 65A are optimally positioned relative to the magnetic fields in the first magnet gap 54A, the control system 15 directs current to the first phase 65A of the first conductor array 40. As the first conductor array 40 moves relative to the magnet component 12, the first phase 65A moves out of its optimal position and the second phase 65B moves into its optimal position. At this time, the control system 15 directs current to the second phase 65B. Subsequently, as the first conductor array 40 moves relative to the magnet component 12, the second phase 65B moves out of its optimal position and the third phase 65C moves into its optimal position. At this time, the control system 15 directs current to the third phase 65C. Simultaneously, reduced levels of current with appropriate polarities are applied to the coils of phases which are not optimally positioned. This process is repeated as the first conductor array 40 moves along the first magnet gap 54A.

Stated another way, as the conductor component 14 moves along the X axis relative to the magnet component 12, the control system 15 independently adjusts the current to each of the phases 65A, 65B, 65C of the first conductor array 40 as the coils of the phases 65A, 65B, 65C move from the field of one permanent magnet pair to the adjacent pair in the first magnet gap 54A. Also, the control system 15 adjusts the current to the phases 65A, 65B, 65C as the demands for the motor 10 change.

Additionally, when electrical current flows in the coils 64 of the first conductor array 40, a first stray magnetic field external to the motor 10 is generated. Because, the phases 65A, 65B, 65C of the first magnet array 40 will be energized at different times in order to provide a continuous motive force, the first stray magnetic field will in general be a time dependent magnetic field.

Similarly, the electrical current in the second conductor array 42 interacts with the magnetic fields that surround the magnets 56 in the second magnet gap 54B. When electric currents flow in the wires of the coils 64 of the second conductor array 42, Lorentz type forces are generated in a direction mutually perpendicular to the direction of the wires of the coils 64 of the second conductor array 42 and the magnetic fields in the second magnet gap 54B. If the current magnitudes and polarities are adjusted properly to the alternating polarity of the magnet fields of the magnets 56 in the second magnet gap 54B, based on the relative position of the second conductor array 42, a controllable second force on the second conductor array 42 is generated.

More specifically, for the second conductor array 42, the control system 15 independently adjusts current to the coils of each of the phases 65A, 65B, 65C based upon which of the phases is optimally positioned relative to the magnetic fields in the second magnet gap 54B. For example, if the first phase 65A is optimally positioned relative to the magnetic fields in the second magnet gap 54B, the control system 15 directs current to the first phase 65A of the second conductor array 42. As the second conductor array 42 moves relative to the magnet component 12, the first phase 65A moves out of its optimal position and the second phase 65B moves into its optimal position. At this time, the control system 15 directs current to the second phase 65B. Subsequently, as the second conductor array 42 moves relative to the magnet component 12, the second phase 65B moves out of its optimal position and the third phase 65C moves into its optimal position. At this time, the control system 15 directs current to the third phase 65C. Simultaneously, reduced levels of current with appropriate polarities are applied to the coils of phases which are not optimally positioned. This process is repeated as the second conductor array along the second magnet gap 54B.

Thus, as the conductor component 14 moves along the X axis relative to the magnet component 12, the control system 15 independently adjusts the current to each of the phases 65A, 65B, 65C of the second conductor array 42 as the phases 65A, 65B, 65C move from the field of one permanent magnet pair to the adjacent pair in the second magnet gap 54B. Also, the control system 15 adjusts the current to the phases 65A, 65B, 65C of the second conductor array 42 as the demands for the motor 10 change.

Additionally, when electrical current flows in the coils 64 of the second conductor array 42, a second stray magnetic field external to the motor 10 is generated. Because, the phases 65A, 65B, 65C of the second magnet array 42 will be energized at different times in order to provide a continuous motive force, the second stray magnetic field will in general be a time dependent magnetic field.

In summary, the control system 15 directs currents to each phase 65A, 65B, 65C of the first conductor array 40 and directs currents to each phase 65A, 65B, 65C of the second conductor array 42. Importantly, the currents directed to the phases 65A, 65B, 65C of the first conductor array 40 are substantially opposite in direction to the currents directed to the phases 65A, 65B, 65C respectively of the second conductor array 40. Preferably, for the embodiments described herein, the currents directed to the phases 65A, 65B, 65C of the first conductor array 40 are substantially equal in magnitude to the currents directed to the phases 65A, 65B, 65C of the second conductor array 40. Stated another way, the control system 15 independently directs a first current to the appropriate phase of the first conductor array 40 and a second current to the corresponding phase of the second conductor array 42. The first current is substantially equal in magnitude and opposite in direction to the second current. With this design, the first stray magnetic field from the electrically excited first conductor array 40 and the second stray magnetic field from the electrically excited second conductor array 42 of the first conductor group 62 should nearly cancel at a distance. If the magnetically permeable parts of the motor 10 structures surrounding the two conductor arrays 40, 42 are similar, then the stray magnetic fields from the two conductor arrays 40, 42 at a distance should be nearly equal and opposite, so that the resultant stray magnetic field from the conductor component 14 should be reduced or minimized.

Further, as provided above, the first conductor array 40 is Immersed in the magnetic fields from magnet arrays 50, 53A in the first magnet gap 54A. Similarly, the second conductor array 42 is immersed in the magnetic fields from magnet arrays 52, 53B in the second magnet gap 54B. As discussed above, the alternating magnetic fields from magnet arrays 50, 53A are substantially opposite in direction from the alternating magnetic fields of corresponding magnet pairs from magnet arrays 52, 53B. With this design, when the conductor arrays 40, 42 of the first conductor group 62 are energized by the control system 15, corresponding parts of each of the conductor arrays 40, 42 are positioned in magnetic fields pointing in opposite directions. More specifically, for the first conductor group 39, the excited phases 65A, 65B, 65C of the first conductor array 40 and the excited phases 65A, 65B, 65C of the second conductor array 42 are always positioned to lie in magnetic fields of the opposite polarity for corresponding parts.

As a result of this design, the first force created by the electrically excited first conductor array 40 and the second force created by the electrically excited second conductor array 42 are in the same direction and are used to move one of the components 12, 14 relative to the other component 14, 12. Stated another way, the opposite currents running through the first conductor array 40 and the second conductor array 42 produce approximately equal forces in the same direction assuming the magnitudes of the magnetic fields of the magnets 56 are approximately equal and the corresponding currents in the two arrays are equal and opposite.

In summary, because the currents are opposite in the conductor arrays 40, 42, the electrically excited second conductor array 42 generates a time dependent second magnetic field that cancels and or reduces the time dependent first stray magnetic field generated by the electrically first conductor array 40. Further, the motor architecture and coil location are such that when the conductor arrays 40, 42 are energized to provide a net force, each conductor array 40, 42 finds itself in magnetic fields pointing in the opposite directions at corresponding locations on the two conductor arrays. Therefore, the currents in the coils will be opposed, as will their resulting time dependent magnetic fields.

As discussed in detail below, the degree of magnetic field cancellation from the conductor component 14 depends upon (i) the equality of the designs of the coils 64 in the conductor arrays 40, 42 of the conductor group 39, (ii) the equality of the currents directed to the conductor arrays 40, 42, iii) the magnetic environment surrounding each conductor array 40, 42, and (iv) the relative locations of the corresponding coils of arrays 40, 42.

FIGS. 2A–2D illustrate a second embodiment of a motor 10 having features of the present invention. The embodiment illustrated in FIGS. 2A–2D is a single degree of motion linear motor 10 somewhat similar to the motor 10 illustrated in FIGS. 1A–1E. In the embodiment illustrated in FIGS. 2A–2D, the magnet component 12 is exactly the same and the conductor component 14 is somewhat similar to the design illustrated in FIGS. 1A–1E and described above.

More specifically, in the embodiment illustrated in FIGS. 2A–2D, the conductor component housing 38 again includes the attachment section 58, the first conductor section 60A and the second conductor section 60B. Further, in FIGS. 2A–2D, the conductor component 14 again includes the first conductor group 62 having the first conductor array 40 and the second conductor array 42 that drive the conductor component 14 when electrically excited. For the first conductor group 62, the electrically excited second conductor array 42 generates the second magnetic field that cancels and or reduces the first stray magnetic field generated by the electrically first conductor array 40.

In FIGS. 2A–2D, the first conductor array 40 is positioned within the first magnet gap 54A and the second conductor array 42 is positioned within the second magnet gap 54B.

With this design, corresponding parts of each of the conductor arrays 40, 42 of the first conductor group 62 are positioned in magnetic fields pointing in the opposite direction.

For the embodiment illustrated in FIGS. 2A–2D, for a given phase, assuming again a three phase motor, the coils are spaced a distance of 4(n+1)p apart where n is an integer. Normally n =0. Phase 65B is shifted relative to phase 65A by a distance of 4(n+1/3)p; phase 65C is shifted relative to phase 65A by a distance of 4(n+2/3)p. In the embodiment illustrated in FIGS. 2A–2D, the control system 15 again independently directs current to each phase 65A, 65B, 65C in each of the conductor arrays 40, 42 of the first X conductor group 62. Moreover, the currents directed to the phases of the first conductor array 40 are substantially equal in magnitude and opposite in direction to the currents directed to the corresponding phases of the second conductor array 42. With this design, the first stray magnetic field from the electrically excited first conductor array 40 and the second stray magnetic field from the electrically excited second conductor array 42 of the first conductor group 62 should nearly cancel at a distance.

Moreover, as provided above, the first conductor array 40 is immersed in the magnetic fields in the first magnet gap 54A and the second conductor array 42 is immersed in the magnetic fields in the second magnet gap 54B. Further, the alternating magnetic fields in the first magnet gap 54A are opposite in direction from the corresponding magnetic fields in the second magnet gap 54B. With this design, for the first conductor group 62, the excited phase 65A, 65B, 65C of the first conductor array 40 and the excited phase 65A, 65B, 65C of the second conductor array 42 are always positioned to lie in the magnetic fields of the opposite polarity. Thus, the opposite currents running through the first conductor array 40 and the second conductor array 42 produce forces in the same direction.

FIGS. 3A and 3B, illustrate a third embodiment of a motor 10 having features of the present invention. The embodiment illustrated in FIGS. 3A and 3B is a single degree of motion linear motor 10 somewhat similar to the motor illustrated in FIGS. 1A–1E. In the embodiment illustrated in FIGS. 3A and 3B, the magnet component 12 and the conductor component 14 are somewhat similar to the design illustrated in FIGS. 1A–1E and described above. However, the design illustrated in FIGS. 3A and 3B has a smaller overall profile and can be manufactured cheaper than the embodiment illustrated in FIGS. 1A–1E.

More specifically, in the embodiment illustrated in FIGS. 3A and 3B, the magnet component housing 34 is somewhat "W" shaped and includes the first wall 44, the second wall 46, the intermediate wall 47 and the separator 48 that are secured together. However, in this embodiment, the distance between the walls 44, 46, 47 is less than the distance between the walls 44 illustrated in FIGS. 1A–1E.

Further, in the embodiment illustrated in the FIGS. 3A and 3B, the magnet component 12 includes the first magnet array 50 and the second magnet array 52 and not the intermediate magnet arrays 53A, 53B (illustrated in FIGS. 1A–1E). The first magnet array 50 is secured to the right side of the first wall 44 and the second magnet array 52 is secured to the left side of the second wall 46. In this design, the first magnet array 50 and the intermediate wall 47 are spaced apart by the first magnet gap 54A and the second magnet array 52 and the intermediate wall 47 are spaced apart by the second magnet gap 54B.

In the embodiment illustrated in FIGS. 3A and 3B, the magnets 56 in each magnet array 36 are oriented so that the poles facing the first magnet gap 54A and the second magnet gap 54B alternate between the North pole and the South pole. Further, the polarities of corresponding magnets 56 in the first magnet array 50 and the second magnet array 52 are opposite. As a result of this design, the alternating magnetic fields 57A in the first magnet gap 54A are opposite in direction from the corresponding magnetic fields 57B in the second magnet gap 54B.

Provided the intermediate wall 47 does not become magnetically saturated, i.e. its magnetic permeability is not reduced, the magnetic flux in the gaps 54A, 54B of the embodiment illustrated in FIGS. 3A and 3B will resemble that magnetic flux in the gaps 54A, 54B in the embodiment illustrated in FIGS. 1A–1E. However, the flux intensity of the embodiment illustrated in FIGS. 3A and 3B will be somewhat lower. The amount in which the flux density is lower will depend upon the relative dimensions of the magnets 56 and the gaps 54A, 54B, as well as the properties of the magnets 56.

The design of the conductor component 14 illustrated in FIGS. 3A and 3B is similar to the design illustrated in FIGS. 1A–1E and described above. In this embodiment, the conductor component housing 38 again includes the attachment section 58, the first conductor section 60A and the second conductor section 60B. However, in the embodiment illustrated in FIGS. 3A and 3B, the first conductor section 60A and 60B are closer together than the corresponding components in the embodiment illustrated in FIGS. 1A–1E.

In FIGS. 3A and 3B, the conductor component 14 again includes the first conductor group 62 having the first conductor array 40 and the second conductor array 42 that drive the conductor component 14 when electrically excited. For the first conductor group 62, the electrically excited second conductor array 42 generates the second magnetic field that cancels and/or reduces the first stray magnetic field generated by the electrically first conductor array 40.

In FIGS. 3A and 3B, the first conductor section 60A is positioned within the first magnet gap 54A and the first conductor array 40 is immersed In the magnetic fields from the first magnet array 50. Similarly, the second conductor section 60B is positioned within the second magnet gap 54B and the second conductor array 42 is immersed in the magnetic fields from the second magnet array 52. With this design, corresponding parts of each of the conductor arrays 40, 42 of the first conductor group 62 are positioned in magnetic fields pointing in opposite directions.

In FIGS. 3A and 3B, the control system 15 again directs current to each phase of the first conductor array 40 and directs current to each phase of the second conductor array 42. Further, the currents directed to the first conductor array 40 are substantially equal in magnitude and opposite in direction to the currents directed to the second conductor array 40. With this design, the first stray magnetic field from the electrically excited first conductor array 40 and the second stray magnetic field from the second conductor array 42 of the first conductor group 62 should nearly cancel at a distance.

For the first conductor group 39, the excited phases 65A, 65B, 65C of the first conductor array 40 and the excited phases 65A, 65B, 65C of the second conductor array 42 are always positioned to lie in magnetic fields of the opposite polarity for corresponding parts of the two arrays. Thus, the opposite currents running through the first conductor array 40 and the second conductor array 42 produce forces in the same direction.

Although the magnetic force from the motor 10 illustrated in FIGS. 3A and 3B will be somewhat reduced from the motor 10 illustrated in FIGS. 1A–1E, the net stray magnetic field from the conductor component 14 should be somewhat lower because of the closer proximity of the two conductor arrays 40, 42 of the first conductor group 62.

It should be noted, that when the conductor arrays 40, 42 move relative to the intermediate wall 47, eddy currents will be induced in the walls 44, 46, 47. The eddy currents originate from the magnetic fields from the conductor arrays 40, 42. The eddy currents represent power losses in the motor 10 and complicate the control of the motor 10. Because the coils of a given phase of the conductor arrays 40, 42 generate equal and opposite magnetic fields, the net time varying magnetic fields in the walls 44, 46, 47 should be significantly lower than in a similar standard motor. Thus the motor 10 provided herein will generate significantly lower eddy currents and will be more efficient and easier to control.

FIGS. 4A and 4B, illustrate a fourth embodiment of a motor 10 having features of the present invention. The embodiment illustrated in FIGS. 4A and 4B is a single degree of motion linear motor 10 somewhat similar to the motors described above. In the embodiment illustrated in FIGS. 4A and 4B, the magnet component 12 and the conductor component housing 38 are the same as the equivalent components embodiment illustrated in FIGS. 3A and 3B and the conductor arrays 40, 42 are the same as to the equivalent components illustrated in FIGS. 2A–2D and described above.

More specifically, in FIGS. 4A and 4B, the conductor component 14 again includes the, first conductor group 62 having the first conductor array 40 and the second conductor array 42 that drive the conductor component 14 when electrically excited.

In the embodiment illustrated in FIGS. 4A and 4B, the control system 15 again independently directs current to each phase 65A, 65B, 65C in each of the conductor arrays 40, 42 of the first conductor group 62. The currents directed to the first conductor array 40 are substantially equal in magnitude and opposite in direction to the currents directed to the second conductor array 40. With this design, the first stray magnetic field from the electrically excited first conductor array 40 and the second stray magnetic field from the second conductor array 42 of the first conductor group 62 should nearly cancel at a distance.

Moreover, the first conductor array 40 is immersed in the magnetic fields in the first magnet gap 54A and the second conductor array 42 is immersed in the magnetic fields in the second magnet gap 54B. Further, the alternating magnetic fields in the first magnet gap 54A are opposite in direction from the corresponding magnetic fields in the second magnet gap 54B. With this design, for the first conductor group 62, corresponding parts of the excited phases 65A, 65B, 65C of the first conductor array 40 and the excited phases 65A, 65B, 65C of the second conductor array 42 are always positioned to lie in magnetic fields of the opposite polarity. Thus, the opposite currents running through the first conductor array 40 and the second conductor array 42 produce forces in the same direction.

FIGS. 5A–5C illustrate a fifth embodiment of a motor 10 having features of the present invention. The embodiment illustrated in FIGS. 5A–5C is a single degree of motion linear motor 10. In the embodiment illustrated in FIGS. 5A–5C, the magnet component 12 and the conductor component 14 both differ slightly from the designs described above. Further, the motor illustrated in FIGS. 5A–5C has a smaller overall profile.

More specifically, in the embodiment illustrated in FIGS. 5A–5C, the magnet component housing 34 is somewhat "U" shaped and includes the first wall 44, the second wall 46 and the separator 48 that are secured together. Further, in this embodiment, the magnet component 12 includes the first magnet array 50 and the second magnet array 52. The first magnet array 50 is secured to the right side of the first wall 44 and the second magnet array 52 is secured to the left side of the second wall 46. in this design, the first magnet array 50 and the second magnet array 52 are spaced apart by the first magnet gap 54A. Also in this embodiment, the magnets 56 in each magnet array 50, 52 are oriented so that the poles alternate between the North pole and the South pole. Further, the polarities of corresponding magnets 56 in the first magnet array 50 and the second magnet array 52 are opposed, leading to strong magnetic fields in the first magnet gap 54A.

The magnet component housing 34 of this embodiment is quite similar to those of conventional linear motors. However, the conductor component 14 is not similar to those of conventional motors. Thus, a conventional linear motor could be retrofitted with a new conductor component 14, designed according to this embodiment, to reduce stray magnetic fields.

In FIGS. 5A–5C the conductor component housing 38 is generally "T" shaped and includes the attachment section 58, and the first conductor section 60A. in FIGS. 5A–5C, the conductor component 14 again includes the first conductor group 62 having the first conductor array 40 and the second conductor array 42 that drive the conductor component 14 when electrically excited.

In FIGS. 5A–5C, both the first conductor array 40 and the second conductor array 42 are embedded within the first conductor section 60A and positioned within the first magnet gap 54A. Importantly, the conductor arrays 40, 42 are linearly offset along the axis of motion from each other by distance equal to one magnet pitch. With this design, corresponding parts of the phases of each of the conductor arrays 40, 42 of the first conductor group 62 are positioned in magnetic fields of equal magnitude and pointing in the opposite directions. It should be noted that the conductor arrays 40, 42 are illustrated in FIG. 5C as being offset vertically for clarity. In use, the conductor arrays 40, 42 are preferably not offset vertically.

In the embodiment illustrated in FIGS. 5A–5C, the control system 15 again directs current to each phase of the first conductor array 40 and directs current to each phase of the second conductor array 42. Further, the currents directed to the first conductor array 40 are substantially equal in magnitude and opposite in direction to the currents directed to the second conductor array 42. With this design, the first stray magnetic field from the electrically excited first conductor array 40 and the second stray magnetic field from the electrically excited second conductor array 42 of the first conductor group 62 should nearly cancel at a distance.

Further, for the first conductor group 62, corresponding parts of the excited phases 65A, 65B, 65C of the first conductor array 40 and the excited phases 65A, 65B, 65C of the second conductor array 42 are always positioned to lie in magnetic fields of the opposite polarity. Thus, the opposite currents running through the first conductor array 40 and the second conductor array 42 produce forces in the same direction.

The examples illustrated in FIGS. 1A–5C are directed to motors 10 that are one-dimensional, e.g. move with one degree of freedom. However, as illustrated in FIGS. 6A–7B, the concepts provided herein can be utilized in motors 10 capable of two dimensional linear motion. More specifically, FIGS. 6A–6C illustrate one embodiment of a two dimensional motor and FIGS. 7A and 7B illustrate another embodiment of a two dimensional motor.

More specifically, in FIGS. 6A–6C, the motor 10 is capable of movement along the X axis, along the Y axis and small rotations about the Z axis. In this embodiment, the magnet component housing 34 and the conductor component housing 38 are similar to the equivalent components illustrated in FIGS. 3A–4B and described above.

In FIGS. 6A–6C, the magnet component 12 includes the first magnet array 50 secured to the first wall 44 and the second magnet array 52 secured to the second wall 46. Further, the magnet component 12 defines the first magnet gap 54A and the second magnet gap 54B. In this embodiment, each of the magnet arrays 50, 52 includes both North and South poles facing the first magnet gap 54A and the second magnet gap 54B distributed in both longitudinal and latitudinal directions along the plane of each magnet array 50, 52. Stated another way, in each magnet array 50, 52, the magnets 56 are periodically distributed in the longitudinal and latitudinal direction with an alternating pattern of North and South poles facing the first magnet gap 54A and the second magnet gap 54B along diagonals of each magnet array 50, 52.

Further, the polarities of corresponding magnets 56 in the first magnet array 50 and the second magnet array 52 are opposite. As a result of this design, the alternating magnetic fields in the first magnet gap 54A are opposite in direction from the corresponding magnetic fields in the second magnet gap 54B.

Preferably, the magnets 56 in each magnet array 50, 52 have approximately the same strength. Alternately, for each magnet array 50, 52, the magnets at the edges can be designed to have approximately one-quarter, one-half or three-quarters the strength of magnets not at the boundary of each array. This design may help to maintain constant motor efficiency and decrease magnetic fringe field effects at the edges of the boundary. A more complete discussion of somewhat similar magnet arrays is provided in U.S. Pat. No. 6,127,749. As far as permitted, the disclosure of U.S. Pat. No. 6,127,749 is incorporated herein by reference.

Referring to FIGS. 6A–6C, the conductor component 14 includes a first X conductor group 66, a second X conductor group 68 and a first Y conductor group 70. When electrically excited, (i) the first X conductor group 66 and the second X conductor group 68 cooperate to move the conductor component 14 along the X axis and about the Z axis, and (ii) the first Y conductor group 70 moves the conductor component 14 along the Y axis. In this embodiment, (i) the first X conductor group 66 includes a first X conductor array 72A and a second X conductor array 72B, (ii) the second X conductor group 68 includes a third X conductor array 74A and a fourth X conductor array 74B, and (iii) the first Y conductor group 70 includes a first Y conductor array 76A and a second Y conductor array 76B. As provided herein, the conductor arrays 72A–76B are uniquely positioned, designed and controlled to minimize stray magnetic fields. In this embodiment, the first X conductor array 72A, the second X conductor array 72B, the third X conductor array 74A, and the fourth X conductor array 74B are designed to be identical, and the first Y conductor array 76A and the second Y conductor array 76B are designed to be identical.

In FIGS. 6A–6C, (i) the first X conductor array 72A, the third X conductor array 74A, and the first Y conductor array 76A are positioned within the first magnet gap 54A and (ii) the second X conductor array 72B, the fourth X conductor array 74B, and the second Y conductor array 76B are positioned within the second magnet gap 54B. With this design, (i) corresponding parts of each of the conductor arrays 72A, 72B of the first X conductor group 66 are positioned in magnetic fields pointing in opposite directions, (ii) corresponding parts of each of the conductor arrays 74A, 74B of the second X conductor group 68 are positioned in magnetic fields pointing in opposite directions, and (iii) corresponding parts of each of the conductor arrays 76A, 76B of the first Y conductor group 70 are positioned in magnetic fields pointing in opposite directions.

In the embodiment illustrated in FIGS. 6A–6C, (i) each of the X conductor arrays 72A–74B includes a single coil having three phases 65A, 65B, 65C that are staggered along the X axis and (ii) each of the Y conductor arrays 76A–76B includes a single coil having three phases 65A, 65B, 65C that are staggered along the Y axis. A more complete discussion of somewhat similar conductor arrays is provided in U.S. Pat. No. 6,127,749.

In the embodiment illustrated in FIGS. 6A–6C, the control system 15 again independently directs current (i) to each phase 65A, 65B, 65C in each of the conductor arrays 72A, 72B of the first X conductor group 66, (ii) to each phase 65A, 65B, 65C in each of the conductor arrays 74A, 74B of the second X conductor group 68, and (iii) each phase 65A, 65B, 65C in each of the conductor arrays 76A, 76B of the first Y conductor group 70. Moreover, (i) the currents directed to the first X conductor array 72A are equal and opposite in direction to the currents directed to the second X conductor array 72B, (ii) the currents directed to the third X conductor array 74A are equal and opposite in direction to the currents directed to the fourth X conductor array 74B, and (iii) the currents directed to the first Y conductor array 76A are equal and opposite in direction to the currents directed to the second Y conductor array 76B.

As a result thereof, (i) for the first X conductor group 66, the electrically excited second X conductor array 72B generates a second X magnetic field that cancels and/or reduces a first X stray magnetic field generated by the electrically excited first X conductor array 72A, (ii) for the second X conductor group 68, the electrically excited fourth X conductor array 74B generates a fourth X magnetic field that cancels and/or reduces a third X stray magnetic field generated by the electrically excited third X conductor array 74A, and (iii) for the first Y conductor group 70, the electrically excited second Y conductor array 76B generates a second Y stray magnetic field that cancels and/or reduces a first Y stray magnetic field generated by the electrically excited first Y conductor array 76A.

Moreover as provided above, the first X conductor array 72A, the third X conductor array 74A, and the first Y conductor array 76A are immersed in the magnetic fields in the first magnet gap 54A and the second X conductor array 72B, the fourth X conductor array 74B and the second Y conductor array 76B are immersed in the magnetic fields in the second magnet gap 54B. Further, the alternating magnetic fields in the first magnet gap 54A are opposite in direction from the corresponding magnetic fields in the second magnet gap 54B. With this design, (i) for the first X conductor group 66, corresponding parts of the excited phases 65A, 65B, 65C of the first X conductor array 72A and the excited phases 65A, 65B, 65C of the second X conductor array 72B are always positioned to lie in magnetic fields of the opposite polarity, (ii) for the second X conductor group 68, corresponding parts of the excited phases 65A, 65B, 65C of the third X conductor array 74A and the excited phases 65A, 65B, 65C of the fourth X conductor array 74B are always positioned to lie in magnetic fields of the opposite polarity, and (iii) for the first Y conductor group 70, corresponding parts of the excited phases 65A, 65B, 65C of the first Y conductor array 76A and the excited phases 65A, 65B, 65C of the second Y conductor array 76B are always positioned to lie in magnetic fields of the opposite polarity.

Thus, (i) for the first X conductor group 66, the opposite currents running through the first X conductor array 72A and the second X conductor array 72B produce forces in approximately the same direction along the X axis, (ii) for the second X conductor group 68, the opposite currents running through the third X conductor array 74A and the fourth X conductor array 74B produce forces in approximately the same direction along the X axis, and (iii) for the first Y conductor group 70, the opposite currents running through the first Y conductor array 76A and the second Y conductor array 76B produce forces in approximately the same direction along the Y axis. Moreover, by adjusting the forces generated by the first X conductor group 66 and the second X conductor group 68, motion about the Z axis can be obtained.

FIGS. 7A and 7B illustrate another version of a two dimensional linear motor 10. In this embodiment, the motor 10 is capable of movement along the X axis, along the Y axis and small rotations about the Z axis. In this embodiment, the magnet component housing 34 and the conductor component housing 38 are similar to the equivalent components illustrated in FIGS. 5A–5C and described above. Further, the first magnet array 50 and the second magnet array 52 are similar to the equivalent components illustrated in FIGS. 6A–6C and described above In FIGS. 7A and 7B, the first magnet array 50 is secured to the first wall 44 and the second magnet array 52 is secured to the second wall 46. Further, the magnet component 12 defines the first magnet gap 54A. In this embodiment, each of the magnet arrays 50, 52 includes both North and South poles facing the first magnet gap 54A and distributed in both longitudinal and latitudinal directions along the plane of each magnet array 50, 52. Further, the polarities of the magnetic poles facing the first magnet gap 54A of corresponding magnets 56 in the first magnet array 50 and the second magnet array 52 are opposite. In other words North pole faces South pole across the first magnet gap 54A.

Referring to FIG. 7B, the conductor component 14 includes the first X conductor group 66 and the first Y conductor group 70. When electrically excited, the first X conductor group 66 moves the conductor component 14 along the X axis and about the Z axis and the first Y conductor group 70 moves the conductor component along the Y axis. In this embodiment, (i) the first X conductor group 66 includes the first X conductor array 72A and the second X conductor array 72B, and (ii) the first Y conductor group 70 includes a first Y conductor array 76A and a second Y conductor array 76B.

In FIGS. 7A and 7B, all of the conductor arrays 72A, 72B, 76A, 76B are secured to the first conductor section 60A and positioned within the first magnet gap 54A. Importantly, (i) the first X conductor array 72A and the second X conductor array 72B are linearly offset in both the X and Y directions from each other, and (ii) the first Y conductor array 76A and the second Y conductor array 76B are linearly offset along the Y direction. With this design, the corresponding parts of the phases of each of the conductor arrays 72A, 72B of the first X conductor group 66 are positioned in magnetic fields pointing in opposite directions. Similarly, the corresponding parts of the phases of each of the conductor arrays 76A, 76B of the first Y conductor group 70 are positioned in magnetic fields pointing in opposite directions.

Further, in the embodiment illustrated in FIGS. 7A and 7B, (i) each of the X conductor arrays 72A–72B includes a single coil for each of the three phases 65A, 65B, 65C that are staggered along the X axis and (ii) each of the Y conductor arrays 76A–76B includes a single coil for each of the three phases 65A, 65B, 65C that are staggered along the Y axis.

In this embodiment, the control system 15 again independently directs current (i) to each phase 65A, 65B, 65C in each of the conductor arrays 72A, 72B of the first X conductor group 66, and (ii) each phase 65A, 65B, 65C in each of the conductor arrays 76A, 76B of the first Y conductor group 70. Moreover, (i) the currents directed to the first X conductor array 72A are opposite in direction to the currents directed to the second X conductor array 72B, and (ii) the currents directed to the first Y conductor array 76A are opposite in direction to the currents directed to the second Y conductor array 76B.

As a result thereof, (i) for the first X conductor group 66, the electrically excited second X conductor array 72B generates a second X magnetic field that cancels and/or reduces a first X stray magnetic field generated by the electrically excited first X conductor array 72A, and (ii) for the first Y conductor group 70, the electrically excited first Y conductor array 76B generates a second Y stray magnetic field that cancels and/or reduces a first Y stray magnetic field generated by the electrically excited first Y conductor array 76A.

Moreover, as provided above, (i) for the first X conductor group 66, the excited phases 65A, 65B, 65C of the first X conductor array 72A and the excited phases 65A, 65B, 65C of the second X conductor array 72B are always positioned to lie in magnetic fields of the opposite polarity for corresponding parts, and (ii) for the first Y conductor group 70, the excited phases 65A, 65B, 65C of the first Y conductor array 76A and the excited phases 65A, 65B, 65C of the second Y conductor array 76B are always positioned to lie in magnetic fields of the opposite polarity for corresponding parts.

Thus, (i) for the first X conductor group 66, the opposite currents running through the first X conductor array 72A and the second X conductor array 72B produce forces in approximately the same direction along the X axis, and (ii) for the first Y conductor group 70, the opposite currents running through the first Y conductor array 76A and the second Y conductor array 76B produce forces in approximately the same direction along the Y axis.

In the event that a rotation about the Z axis is required, the control system 15 controls the magnitudes of the currents in the first X conductor array 72A and the second X conductor array 72B so that magnitudes are not equal. Although the currents will still flow in opposite directions, the magnitudes will be different, so as to generate a torque to rotate the coil assembly about the Z axis. Thus field cancellation will be somewhat diminished when rotations are required. However, systems employing linear motors are nominally intended for rectilinear motion, and any rotations required are typically small and transient, so field cancellation will usually not be seriously reduced.

In each embodiment, the degree of field cancellation depends upon (i) the equality of the design of the coils in each conductor array 40, 42 of each conductor group 39, (ii) the equality of the currents from the control system 15 to the coils in each conductor array 40, 42 of each conductor group 39, and (iii) the magnetic environment surrounding each conductor array 40, 42. In the absence of surrounding magnetic material, the magnetic fields at a distance from the coils are simple magnetic dipole fields. The simple magnetic dipole fields decrease with the distance from the coil cubed and are proportional to the magnetic dipole moment of the coil. The magnetic dipole moment is equal to the area enclosed by the coil multiplied by the product of the current in the coil and the number of turns of wire in the coil. Therefore, for cancellation to occur, two conductor arrays 40, 42 do not have to be identical. Stated another way, for each conductor group 39 (i) the size and shape of the coils in the first conductor array 40 and the current through the first conductor array 40 can be different from (ii) the size and shape of the coils in the second conductor array 42 and the current through the second conductor array 42 as long as the magnetic dipole moment from the first conductor array 40 is approximately equal to the magnetic dipole moment from the second conductor array 42.

The fact that the magnetic fields from the two conductor arrays 40, 42 have the same simple functional form implies that cancellation over a substantial volume of space should take place.

It is still desirable that the forces generated in the first and second conductor arrays be substantially equal. If the first and second conductor arrays are not identical, the forces can still be maintained substantially equal by appropriate changes in the magnitudes of the magnetic fields experienced by the two conductor arrays, and/or by appropriate changes in coil dimensions which leave the magnetic moment unchanged.

The highest degree of cancellation is likely to result from the use of bare coils that are unaccompanied by any magnetic material. This is calculated below in order to obtain some benchmarks. The addition of magnetic material around the conductor arrays 40, 42 may influence the cancellation. However, far enough away from the material, the magnetic fields will again be dipole fields, so modification to the coils to adjust their magnetic dipole moments appropriately, should reestablish the cancellation. This modification may be obtained theoretically or empirically. Closer to the magnetic material, the fields from the coils will in general be somewhat more complicated. In this case, the degree of cancellation must be determined on a case by case basis.

Figure 8:
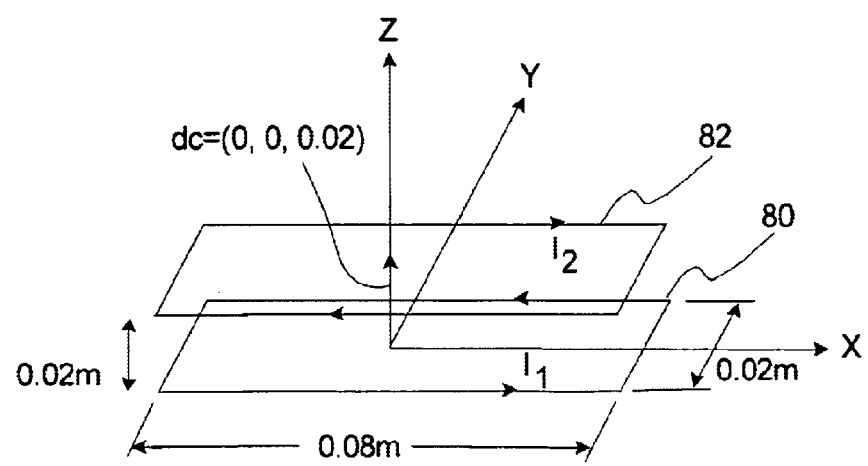
FIG. 8 illustrates a pair of coils having features of the present invention.

Several basic geometric relationships between the two coils were considered. FIG. 8 illustrates a first coil 80 and a second coil 82 that are substantially parallel. In this embodiment, each of the coils 80, 82 is generally rectangular shaped with dimensions of approximately 0.02 m along the Y axis and approximately 0.08 m along the X axis. The magnetic field from each coil 80, 82 is calculated using the Biot-Savart law. The fields from the two coils 80, 82 were then combined, given their relative locations.

In FIG. 8, the origin of coordinate system is in the center of the first coil 80 and the first coil 80 is positioned in the XY plane. The second coil 82 is parallel to the first coil 80 but displaced by the vector distance dc=(dc1, dc2, dc3). In the embodiment illustrated in FIG. 8, second coil 82 is displaced along the Z axis by the vector distance dc=(0, 0, 0.02). Stated another way, the second coil 82 is displaced 0.02 m along the Z axis relative to the first coil 80. The net field generated by the coils 80, 82 if the current to first coil 80 is opposite from the current to the second coil 82 is given by the equation $$B{\rm minus}=B1+B2,$$

where the magnetic fields from both coils 80, 82 are calculated with the same current magnitude.

Alternately, for a conventional motor employing the same two coils, the current to both coils 80, 82 is in the same direction. It is assumed that the magnetic fields from the magnet array have been suitably altered, so that a net force is generated when the currents in the two conductor arrays flow in the same direction. Thus, the net magnetic field from a comparable conventional motor is substantially given by $$B{\rm plus}=B1+B2.$$

As provided herein, the degree of magnetic field cancellation is defined as bratio (x, y, z), where $$\text{bratio }(x,\ y,\ z)=[(B{\rm minus}\cdot B{\rm minus})/(B{\rm plus}\cdot B{\rm plus})]^{1/2}.$$

It should be noted that bratio is a scalar, and expressions of the form V·V represent the dot product of the vector V. The bratio represents how much the total magnetic field intensity is reduced by a motor 10 made in accordance with the present invention relative to a comparable conventional motor of identical coil geometry. While it is important to know how much each component of the magnetic field is reduced, a ratio of the components of Bminus and Bplus is not too useful, because some component of Bplus typically goes through zero at several locations, and the ratio blows up. The individual components of Bminus and Bplus are examined in several cases below.

Figure 9A:
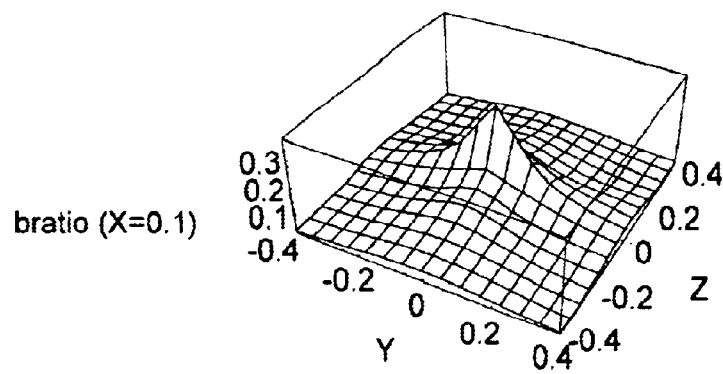
FIGS. 9A–9I illustrate the quantity bratio of two coils over a range of locations and directions.
Figure 9B:
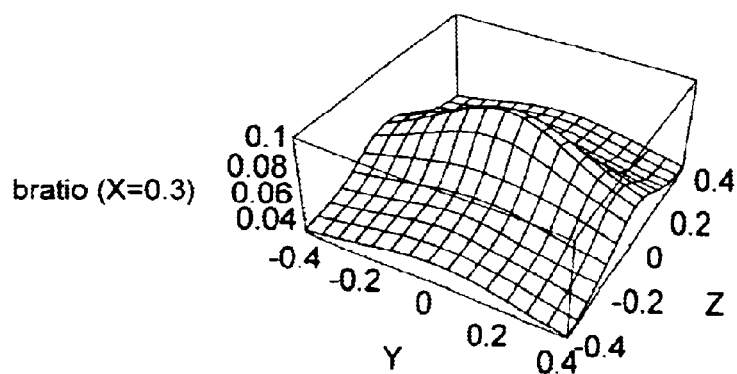
Figure 9C:
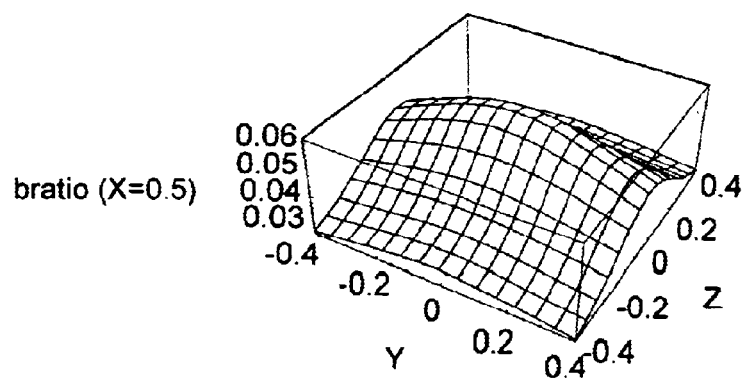
Figure 9D:
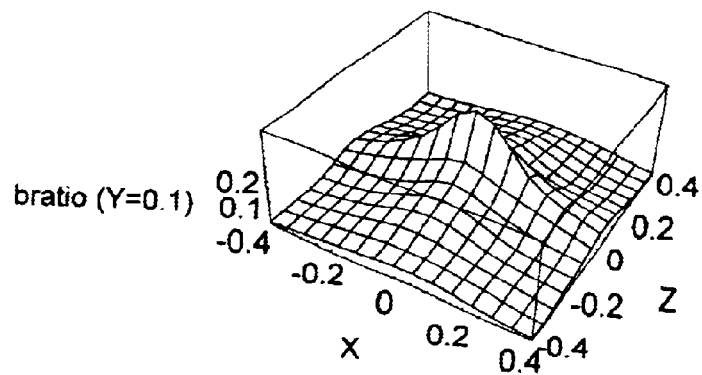
Figure 9E:
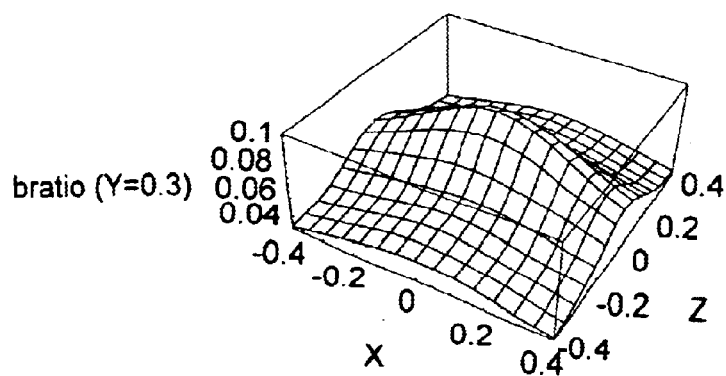
Figure 9F:
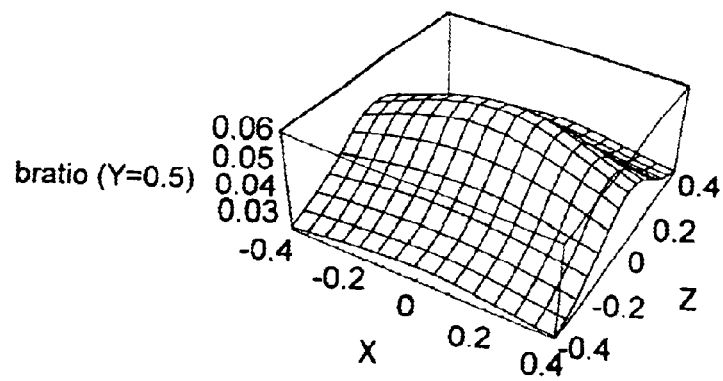
Figure 9G:
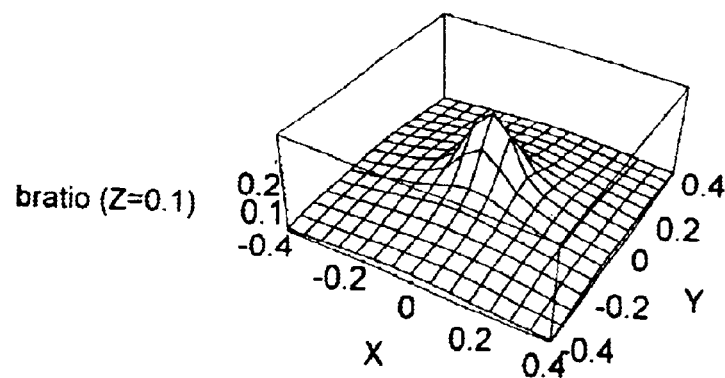
Figure 9H:
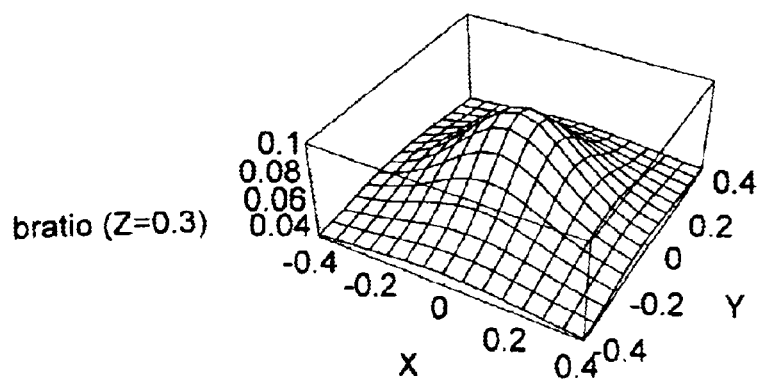
Figure 9I:
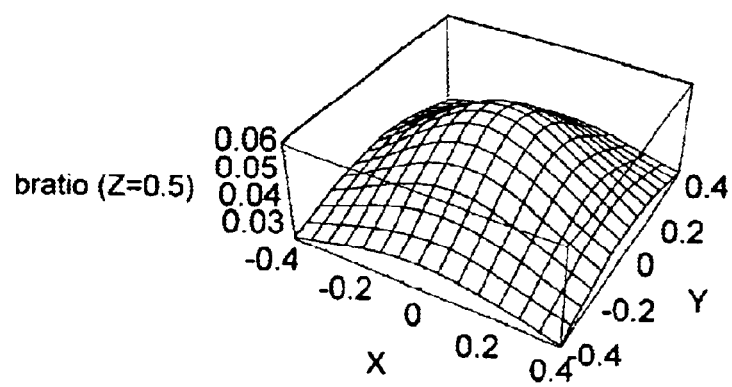

As provided above, in FIG. 8, the first coil 80 and the second coil 82 are spaced apart along the Z axis and are substantially parallel, dc=(0, 0, 0.02). These coils 80, 82 are similar to the geometry of the coils 64 in the embodiments illustrated in FIGS. 1A–1E, 2A–2D. Because, the orientation of the coils 80, 82 and the location of the coils 80, 82 relative to the illumination source 32 (illustrated in FIG. 16) can vary, the bratio was calculated over a range of locations and in different directions. FIGS. 9A–9I illustrate the variation of bratio over planes orthogonal to the X axis, the Y axis, and the Z axis, and for distances of 0.1, 0.3, and 0.5 meters from the center of the first coil 80. As illustrated in FIGS. 9A, 9D, 9G, at a distance of only 0.1 m, the bratio is below 0.4 along the X axis and below 0.3 along the Y axis and the Z axis. As illustrated in FIGS. 9B, 9E, 9H, at a distance of 0.3 m the resultant magnetic field from a motor 10 made pursuant to the present invention is only ten percent (10%) of that of a conventional linear motor. As illustrated in FIGS. 9C, 9F, 9I, at a distance of 0.5 m, the peak value of bratio is less than about 0.06.

Figure 10A:
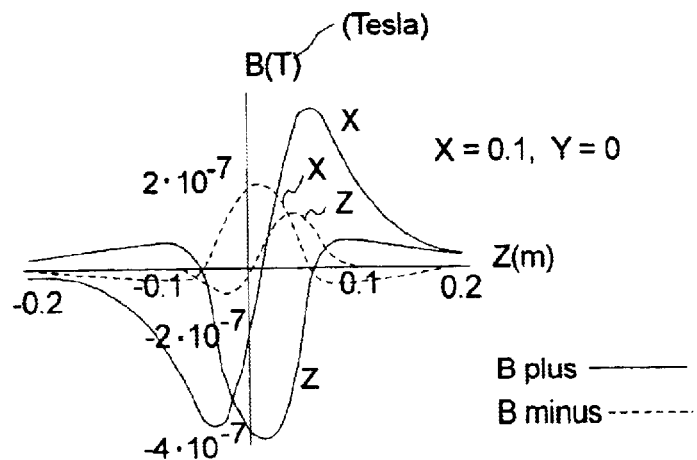
FIGS. 10A–10C are graphs that illustrate Bplus and Bminus for a motor having features of the present invention.
Figure 10B:
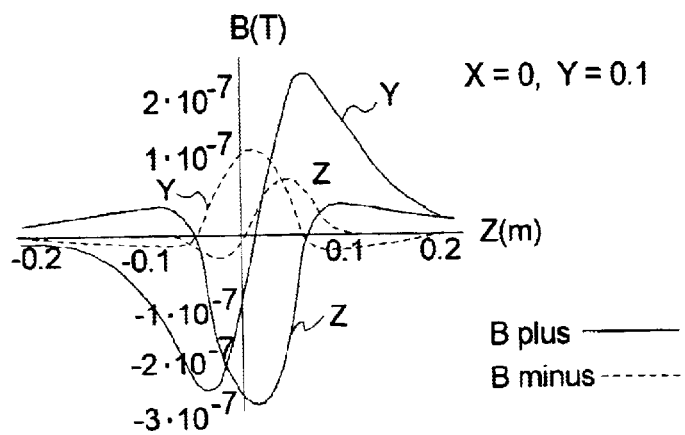
Figure 10C:
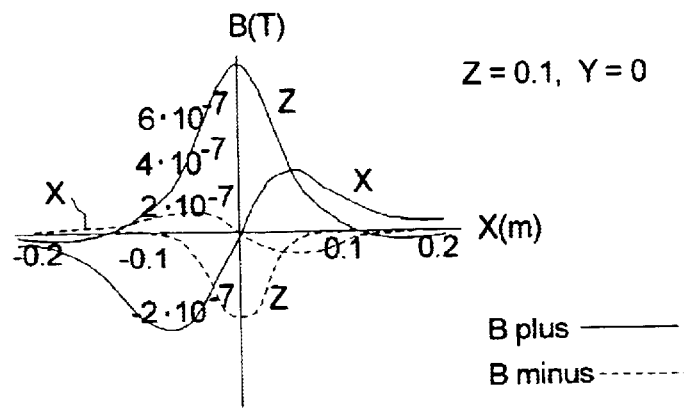

FIGS. 10A–10C illustrated the components of Bplus and Bminus evaluated at locations corresponding to those in FIG. 9A–9I. Note that because the components change sign, there are locations where a given component of Bplus may be smaller than that of Bminus. Nevertheless, the Bminus fields are in general much smaller than those of Bplus.

Figure 11A:
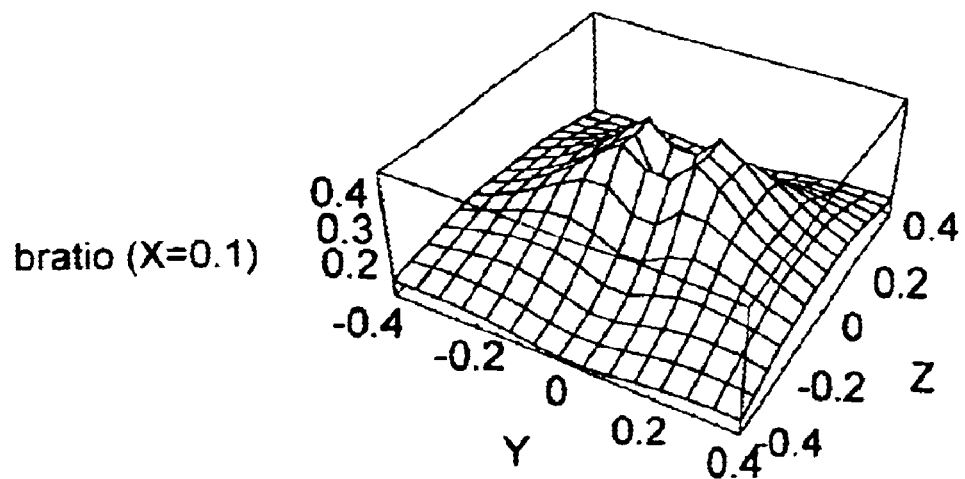
FIGS. 11A and 11B illustrate the bratio of two coils.
Figure 11B:
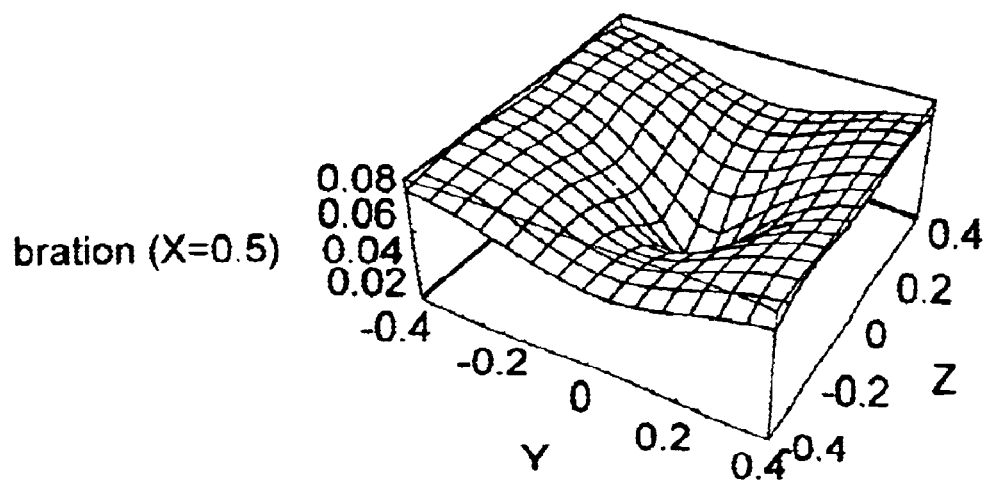

FIGS. 11A and 11B illustrate the bratios for two coils arranged similar to two coils from the first Y conductor group 70 in the embodiment illustrated in FIGS. 7A and 7B. In this embodiment, the coils are parallel and displaced along the Y axis 0.06 meters, dc=(0, 0.06, 0). The current in each coil is equal and opposite. The results are illustrated in FIGS. 11A and 11B for distances from the center of one of the coils along the X axis direction. Peak values of bratio are below 0.5 at X=0.1 m and about 0.08 at X=0.5 m. Note that in FIGS. 11–15 the X, Y and Z axes are those defined in FIG. 8.

Figure 12A:
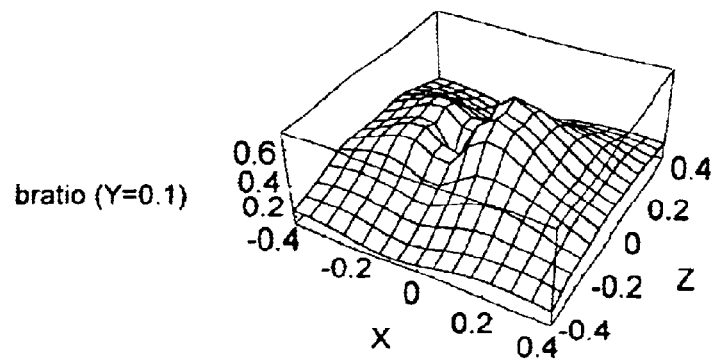
FIGS. 12A–12C illustrate the bratio of two coils.
Figure 12B:
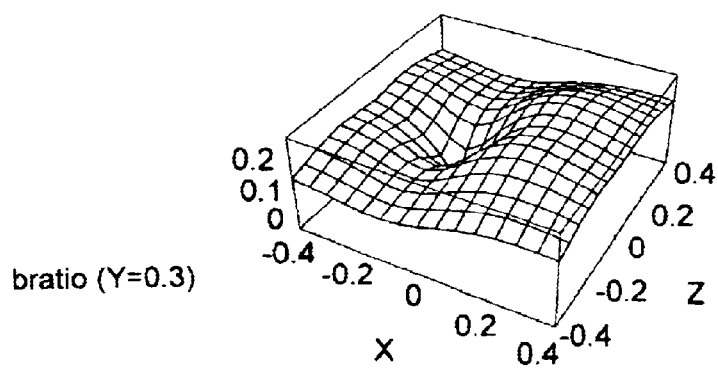
Figure 12C:
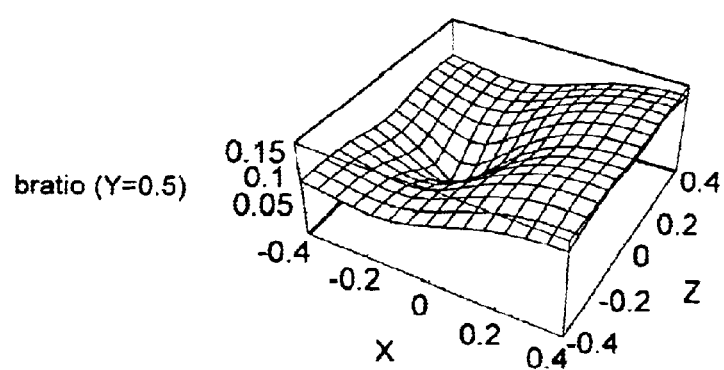
Figure 13:
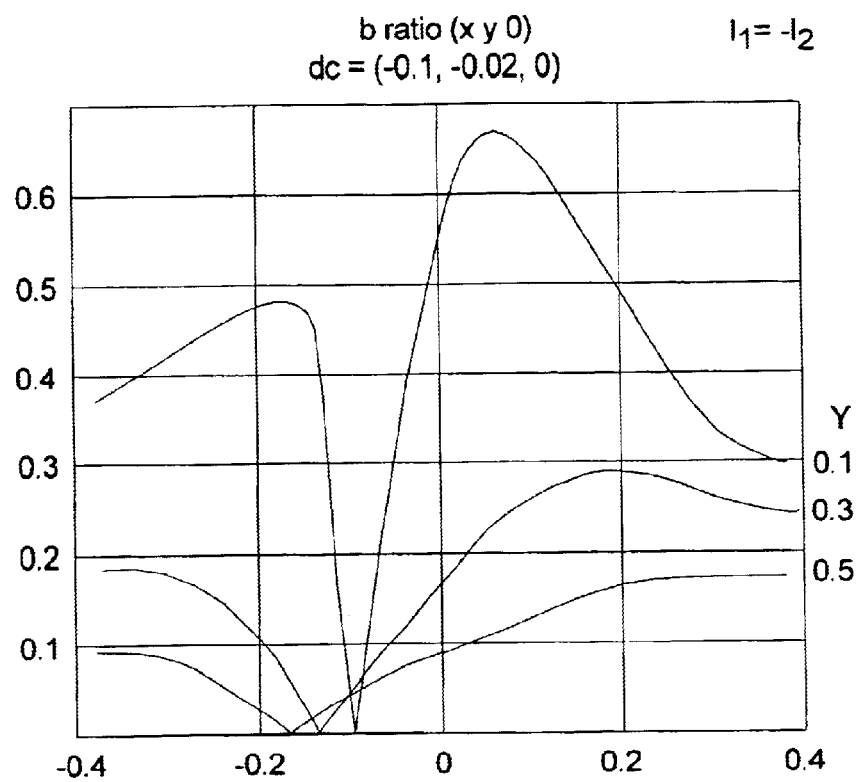
FIG. 13 is a graph that illustrates the variation of the bratio.

FIGS. 12A–12C illustrate the bratio for two coils arranged similar to two coils from the first X conductor group 66 in the embodiments illustrated in FIGS. 7A and 7B. In this embodiment, the second coil is parallel and displaced from the first coil along the X axis −0.1 meters and along the Y axis −0.02 meters, dc=(−0.1, −0.02, 0). The current in each coil is equal and opposite. The peak value of bratio is about 0.66 at a distance of 0.1 m and about 0.28 at 0.3 m. The variation of bratio from FIGS. 12A–12C at Z=0 is plotted in FIG. 13.

Figure 14:
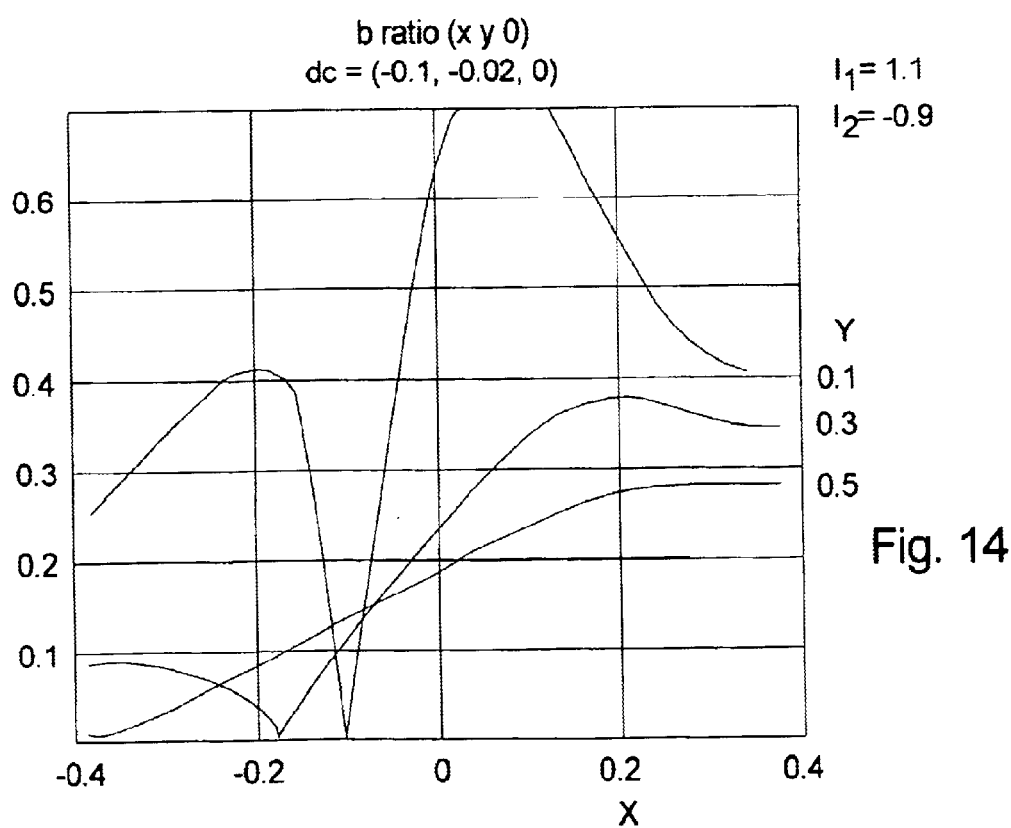
FIG. 14 is another graph that illustrates the variation of the bratio.

Preferably, the motor 10 is positioned so that the e-beam column is always at a location corresponding to X<0 in the coil coordinates, because bratio is smaller, so cancellation is better. In a situation like this, where the two coils are not symmetrically located relative to the column, assigning equal and opposite currents to the two coils may not represent the best situation. FIG. 14 illustrates the same data as FIG. 13, but the ratio of the currents in the first coil to that in second coil is about −1.2. Although the peak value of bratio is higher, bratio is significantly lower when X<0. Therefore, tuning the relative magnitudes of the currents to the coils may improve cancellation further.

Figure 2A:
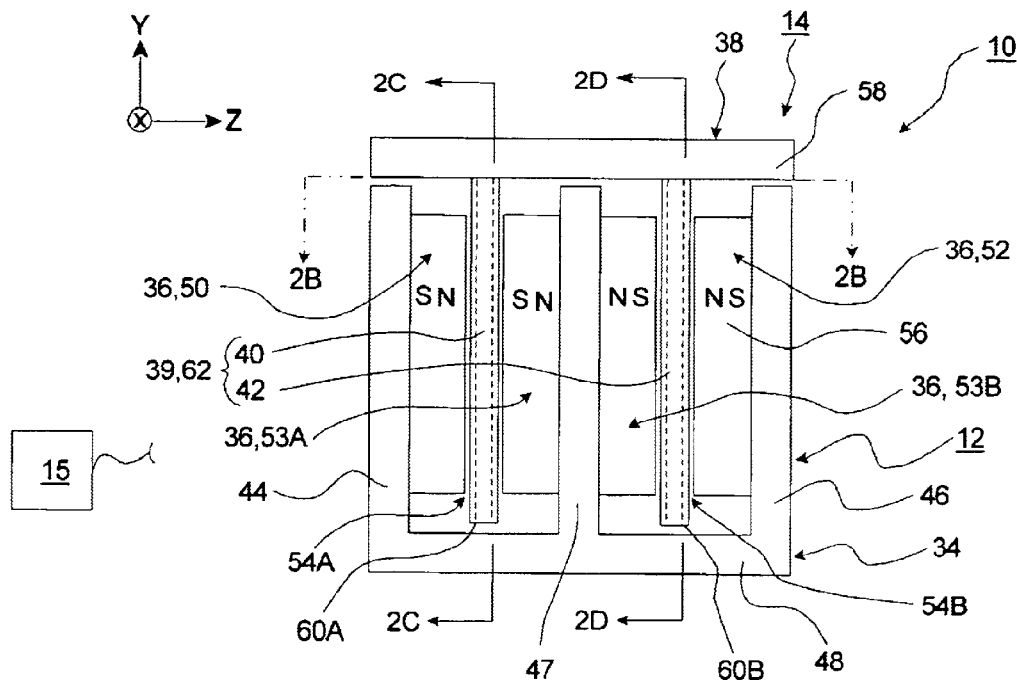
FIG. 2A is an end view of a second embodiment of a linear motor having features of the present invention.
Figure 2B:
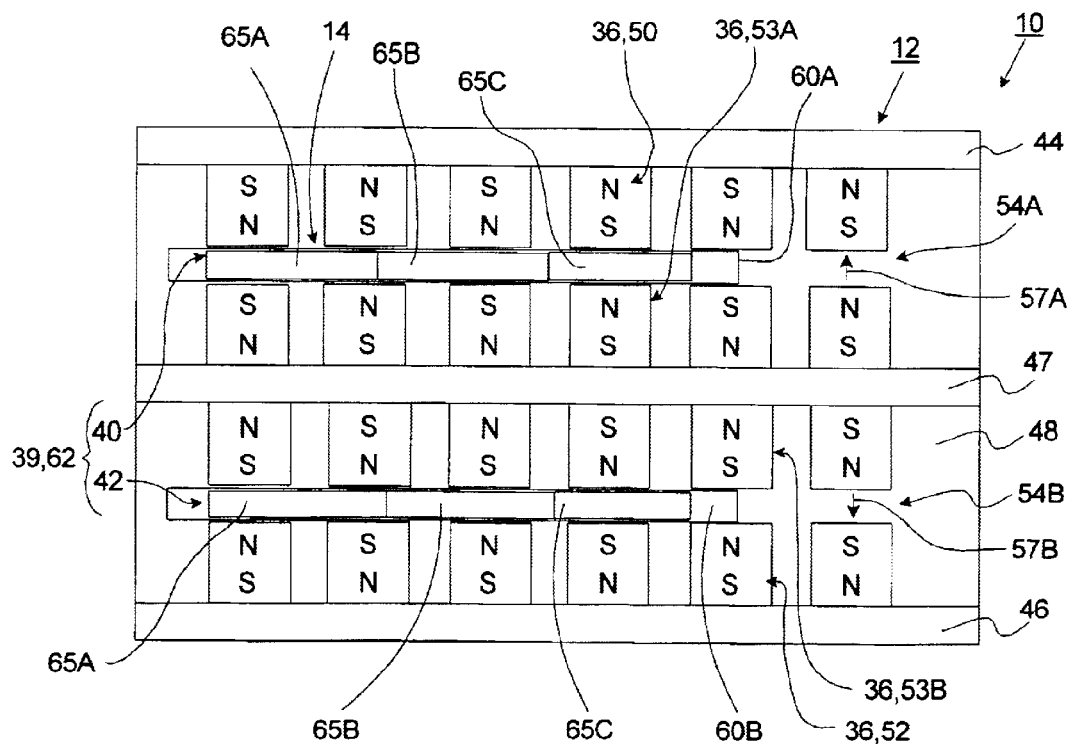
FIG. 2B is a cut-away view taken on line 2B—2B in FIG. 2A.
Figure 2C:
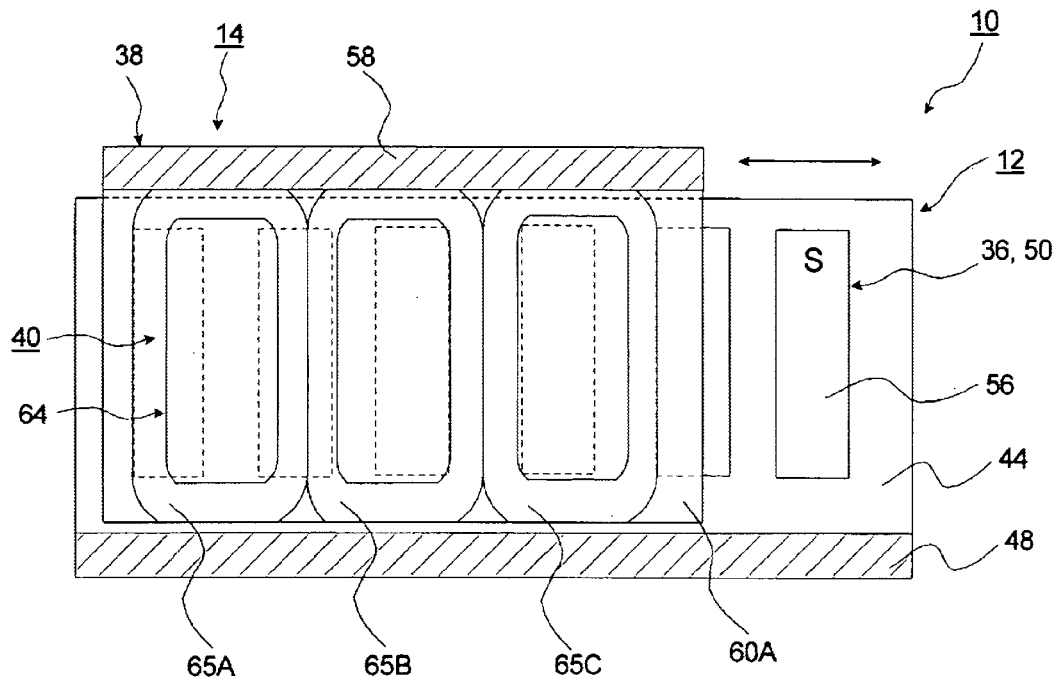
FIG. 2C is a cut-away view taken on line 2C—2C in FIG. 2A.
Figure 2D:
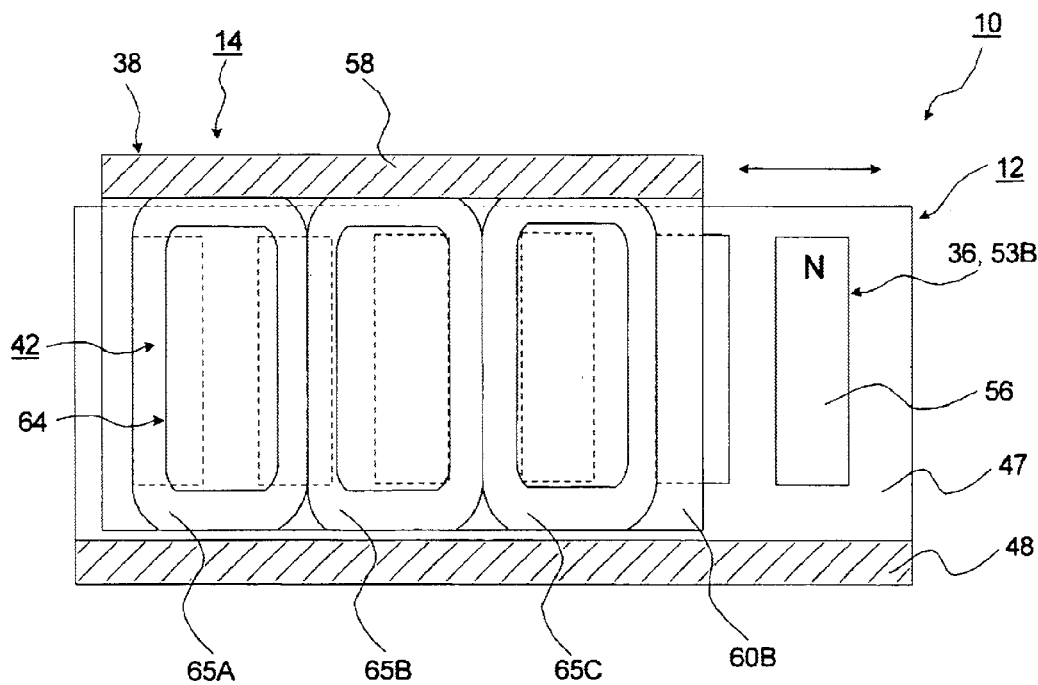
Figure 15A:
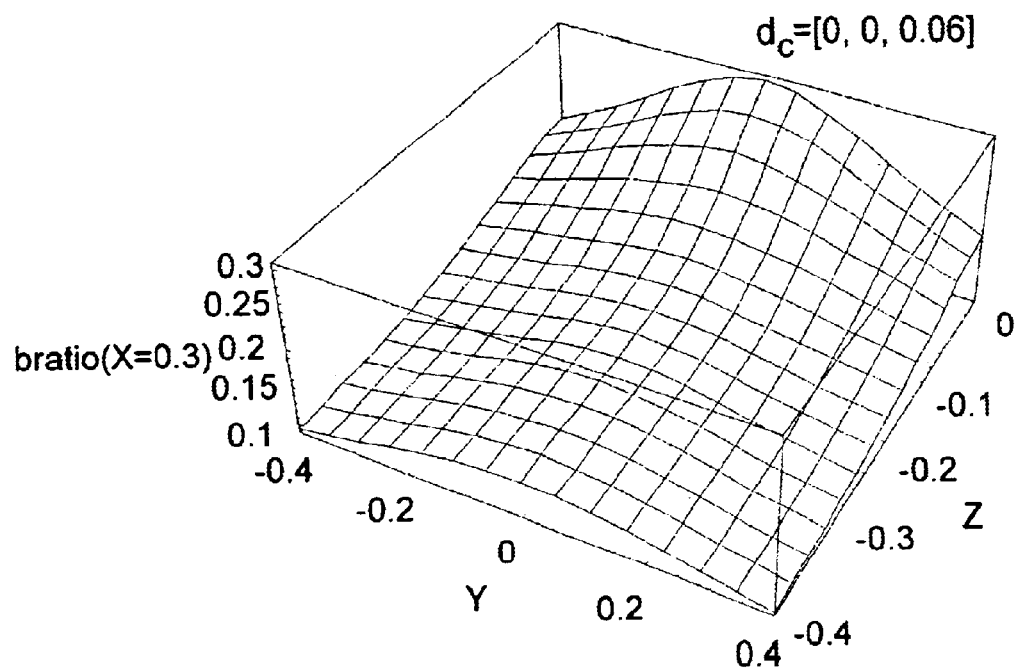
FIGS. 15A–15C illustrate the bratio of two coils.
Figure 15B:
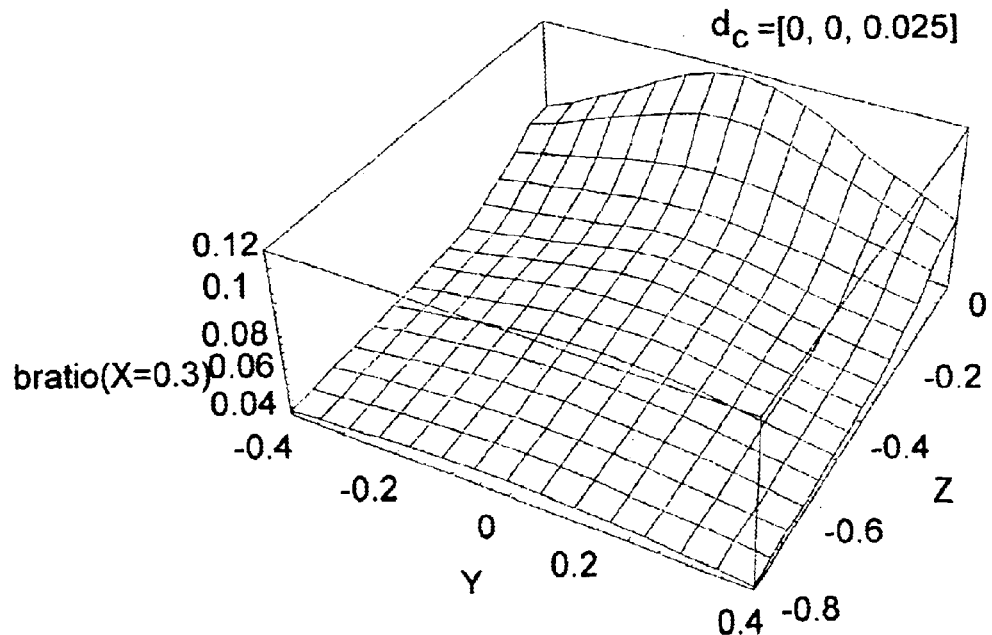
Figure 15C:
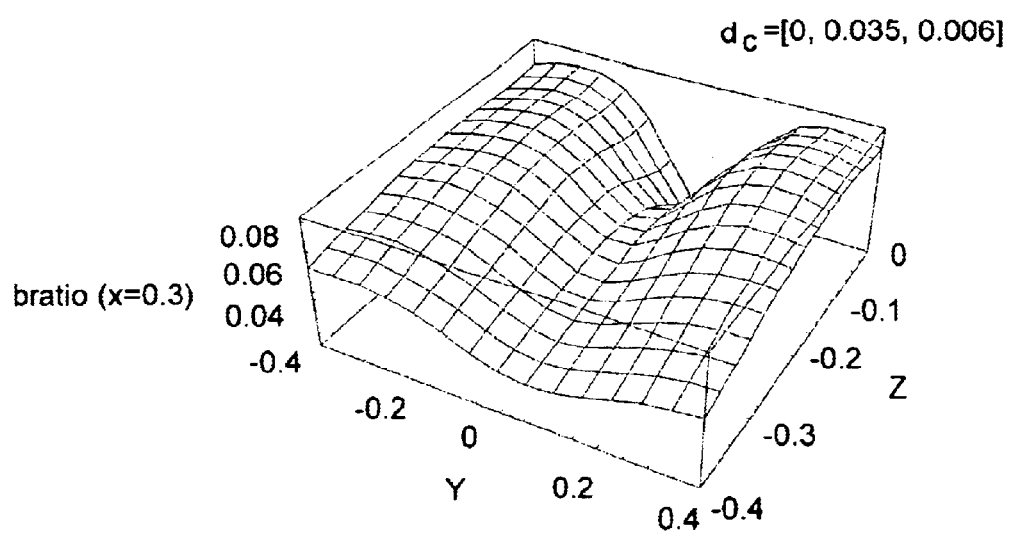

FIGS. 15A–15C illustrate the quantity bratio as a function of Y and Z for a fixed distance of X=0.3 m for a pair of coils arranged similar to the coils illustrated in FIGS. 2B, 4B, and 5B.

In summary, the conductor component 14 provided herein reduces the magnitude of stray magnetic fields generated by the electric motor 10, without significantly influencing the dynamic performance of the motor 10. The amount of reduction of the stray magnetic field will depend upon the design of the motor 10. As provided herein, a reduction of the By component of the stray AC magnetic field at a distance of 300 mm or greater can be greater than a factor of at least 10, and more preferably a factor of at least approximately 25, and even more preferably a factor of at least approximately 50 and still more preferably a factor of at least approximately 100.

Stated another way, the second stray magnetic field cancels at least approximately 10 percent, and more preferably at least approximately 50 percent, and even more preferably at least approximately 90 percent or more of the first stray magnetic field beyond a distance of approximately 300 mm from the first conductor array.

FIG. 16 illustrates an exposure apparatus 18 that utilizes one or more motors 10 having features of the present invention. More specifically, FIG. 16 illustrates the exposure apparatus 18 including a reticle stage assembly 26 having two of the motors 10 and a wafer stage assembly 30 having two of the motors 10. In FIG. 16, the conductor components 14 of two of the motors 10 are secured to a reticle stage 100 and the conductor components 14 of two of the motors 10 are secured to a wafer stage 102. In this design, two of the motors 10 move the reticle stage 100 and two of the motors 10 move the wafer stage 102 in a direction normal to the plane of FIG. 16. In addition, other motors of similar design (not shown) may move the reticle or wafer stage in directions within the plane of the Figure.

Additionally, the exposure apparatus 18 includes a mounting frame 104, the optical assembly 28, the illumination system 24 (irradiation apparatus), a reticle enclosure 108, a wafer enclosure 110 and the control system 15. The exposure apparatus 10 is typically mounted to a mounting base 106. The mounting base 106 can be the ground, a base, or floor, or some other supporting structure.

The exposure apparatus 18 is particularly useful as a lithographic device that transfers a pattern (not shown) of an integrated circuit from the reticle 20 onto the semiconductor wafer 22.

The mounting frame 104 is rigid and supports the components of the exposure apparatus 18. The design of the mounting frame 104 can be varied to suit the design requirements for the rest of the exposure apparatus 18. The mounting frame 104 illustrated in FIG. 16, supports the reticle stage assembly 26, the wafer stage assembly 30, the optical assembly 28, and the illumination system 24 above the mounting base 106. Alternately, for example, separate, individual structures (not shown) can be used to support the stage assemblies 26, 30, the illumination system 24 and the optical assembly 28 above the mounting base 106.

The illumination system 24 includes an illumination source 32 and an illumination optical assembly 112. The illumination source 32 emits the irradiation. The illumination optical assembly 112 guides the irradiation from the illumination source 32 to the optical assembly 28. The beam illuminates selectively different portions of the reticle 20 and exposes the wafer 22. In FIG. 16, the illumination system 24 is illustrated as being supported above the reticle stage 100. Typically, however, the illumination source 32 is secured to one of the sides of the mounting frame 104 and the irradiation from the illumination source 32 is directed to above the reticle stage 100 with the illumination optical assembly 112.

The optical assembly 28 projects and/or focuses the irradiation passing through reticle to the wafer. Depending upon the design of the apparatus 18, the optical assembly 28 can magnify or reduce the image created at the reticle. The above description of the exposure apparatus 18 has been general, as far as the nature of the irradiation used to expose wafers is concerned. The present invention is likely to be most useful when the irradiation consists of charged particles, such as electrons or ions. In that case the wafer enclosure 110 and reticle enclosure 108 are vacuum chambers that are attached to the illumination optical assembly 112 and the optical assembly 28 by hermetic seals. However, even in a photolithography system, where the irradiation consists of photons of any wavelength, certain sensors or other equipment associated with apparatus 18, may by sensitive to stray magnetic fields. Additionally, the reduced eddy currents expected from the motors described herein should improve motor efficiency and controllability. In that case the present invention may be applied with profit to these systems as well.

The reticle stage 100 holds and precisely positions the reticle 20 relative to the optical assembly 28 and the wafer 22. Somewhat similarly, the wafer stage 102 holds and positions the wafer 22 with respect to the projected image of the illuminated portions of the reticle 20. In the embodiment illustrated in FIG. 16, the wafer stage 102 and the reticle stage 100 are positioned by brushless electric motors 10 having features of the present invention.

Additionally, the present invention provided herein can be used in other devices, including other semiconductor processing equipment, elevators, electric razors, machine tools, metal cutting machines, inspection machines and disk drives.

While the particular conductor component 14 and motor 10 as herein shown and disclosed in detail are fully capable of obtaining the objects and providing the advantages herein before stated, it is to be understood that they are merely illustrative of embodiments of the invention and that no limitations are intended to the details of construction or design herein shown other than as described in the appended claims. Additional variations to the motor 10 are possible. For example, shields (not shown) made of magnetically permeable material can be positioned near the motor to further block stray magnetic fields.

What is claimed is:

1. A conductor component for a motor, the motor including a magnet component, the conductor component comprising:

a first conductor group that includes (i) a first conductor array, that when electrically excited, interacts with the magnet component to generate a first force and generates a first stray magnetic field, and (ii) a second conductor array, that when electrically excited, interacts with the magnet component to generate a second force and generates a second stray magnetic field, the second stray magnetic field canceling at least a portion of the first stray magnetic field.

2. The conductor component of claim 1 wherein the first stray magnetic field and the second stray magnetic field are approximately equal in magnitude.

3. The conductor component of claim 1 wherein the second stray magnetic field cancels approximately all of the first stray magnetic field.

4. The conductor component of claim 1 wherein the second stray magnetic field cancels approximately 10 percent of the first stray magnetic field at a distance of approximately 300 mm from the first conductor array.

5. The conductor component of claim 1 wherein the second stray magnetic field cancels the first stray magnetic field by a factor of at least approximately 10.

6. The conductor component of claim 1 wherein the first force and the second force are approximately in the same direction.

7. The conductor component of claim 6 wherein the first force is approximately equal in magnitude to the second force.

8. The conductor component of claim 1 wherein a plane of the first conductor array is approximately parallel to a plane of the second conductor array.

9. The conductor component of claim 1 further comprising a second conductor group that includes (i) a third conductor array, that when electrically excited, interacts with the magnet component to generate a third force and generates a third stray magnetic field, and (ii) a fourth conductor array, that when electrically excited, interacts with the magnet component to generate a fourth force and generates a fourth stray magnetic field, the fourth stray magnetic field canceling at least a portion of the third stray magnetic field.

10. The conductor component of claim 1 further comprising a Y conductor group that includes (i) a first Y conductor array, that when electrically excited, interacts with the magnet component to generate a first Y force and generates a first Y stray magnetic field, and (ii) a second Y conductor array, that when electrically excited, interacts with the magnet component to generate a second Y force and generates a second Y stray magnetic field, the second Y stray magnetic field canceling at least a portion of the first Y stray magnetic field.

11. The conductor component of claim 1 further comprising a conductor component housing that retains the first conductor array and the second conductor array together.

12. A linear motor including the conductor component of claim 1, a magnet component surrounded by at least one magnetic field, and a control system that electrically excites a portion of the first conductor array and electrically excites a portion of the second conductor array.

13. The linear motor of claim 12 wherein the control system directs a first current to the first conductor array and a second current to the second conductor array and wherein the first current is opposite in direction from the second current.

14. The linear motor of claim 13 wherein the first current is substantially equal in magnitude to the second current.

15. The linear motor of claim 12 wherein the magnet component defines a first magnet gap and a second magnet gap and wherein the first conductor array is positioned in the first magnet gap and the second conductor array is positioned in the second magnet gap.

16. The linear motor of claim 15 wherein the magnetic flux in the first magnet gap is substantially opposite from the magnetic flux in the second magnet gap for corresponding locations.

17. The linear motor of claim 12 wherein corresponding parts of the electrically excited portion of the first conductor array and the electrically excited portion of the second conductor array are positioned in magnetic fields of opposite polarity.

18. A stage assembly including the linear motor of claim 12.

19. An exposure apparatus including the linear motor of claim 12.

20. An object on which an image has been formed by the exposure apparatus of claim 19.

21. A semiconductor wafer on which an image has been formed by the exposure apparatus of claim 19.

22. The exposure apparatus of claim 19 including an illumination source that generates an electronic beam.

23. A brushless electric motor comprising:
a magnet component that generates a plurality of magnetic fields; and
a conductor component comprising a conductor component housing and a first conductor group, the conductor component housing retaining the first conductor group, the first conductor group including (i) a first conductor array, that when electrically excited, interacts with the magnet component to generate a first force and generates a first stray magnetic field, and (ii) a second conductor array, that when electrically excited, interacts with the magnet component to generate a second force and generates a second stray magnetic field, the second stray magnetic field canceling at least a portion of the first stray magnetic field; wherein corresponding parts of the electrically excited portion of the first conductor array and the electrically excited portion of the second conductor array are positioned in magnetic fields of opposite polarity.

24. The motor of claim 23 wherein the second stray magnetic field cancels approximately all of the first stray magnetic field.

25. The motor of claim 23 wherein the second stray magnetic field cancels the first stray magnetic field by a factor of at least approximately 100.

26. The motor of claim 23 wherein the first force and the second force are approximately in the same direction.

27. The motor of claim 23 wherein the first conductor array is approximately parallel to the second conductor array.

28. The motor of claim 23 further comprising a Y conductor group that includes (i) a first Y conductor array, that when electrically excited interacts with the magnet component to generate a first Y force and generates a first Y stray magnetic field, and (ii) a second Y conductor array, that when electrically excited, interacts with the magnet component to generate a second Y force and generates a second Y stray magnetic field, the second Y stray magnetic field canceling at least a portion of the first Y stray magnetic field.

29. The motor of claim 23 further comprising a control system that electrically excites a portion of the first conductor array and electrically excites a portion of the second conductor array, the control system directing a first current to the first conductor array and a second current to the second conductor array, wherein the first current is opposite in direction from the second current.

30. The motor of claim 23 wherein the magnet component defines a first magnet gap and a second magnet gap and wherein the first conductor array is positioned in the first magnet gap and the second conductor array is positioned in the second magnet gap, wherein the magnetic flux in the first magnet gap is substantially opposite from the magnetic flux in the second magnet gap.

31. A stage assembly including the linear motor of claim 23.

32. An exposure apparatus including the linear motor of claim 23.

33. An object on which an image has been formed by the exposure apparatus of claim 32.

34. A semiconductor wafer on which an image has been formed by the exposure apparatus of claim 32.

35. A method for manufacturing a brushless electric motor, the method comprising the steps of:
  providing a magnet component that generates a plurality of magnetic fields;
  providing a first conductor group including (i) a first conductor array and a second conductor array;
  electrically exciting the first conductor array, the electrically excited first conductor array (i) interacting with the magnet component to generate a first force and (ii) generating a first stray magnetic field; and
  electrically exciting the second conductor array, the electrically excited second conductor array (i) interacting with the magnet component to generate a second force and (ii) generating a second stray magnetic field; wherein the second stray magnetic field cancels at least a portion of the first stray magnetic field.

36. The method of claim 35 further comprising the step of positioning corresponding parts of the electrically excited portion of the first conductor array and the electrically excited portion of the second conductor array in magnetic fields of opposite polarity.

37. The method of claim 35 further comprising the steps of:
  providing a first Y conductor group including (i) a first Y conductor array and a second Y conductor array;
  electrically exciting the first Y conductor array, the electrically excited first Y conductor array (i) interacting with the magnet component to generate a first Y force and (ii) generating a first Y stray magnetic field; and
  electrically exciting the second Y conductor array, the electrically excited second Y conductor array (i) interacting with the magnet component to generate a second Y force and (ii) generating a second Y stray magnetic field; wherein the second Y stray magnetic field cancels at least a portion of the first Y stray magnetic field.

38. The method of claim 35 further comprising the step of directing a first current to the first conductor array and directing a second current to the second conductor array, the second current being opposite in direction from the first current.

39. The method of claim 35 wherein the step of providing a magnet component includes providing a first magnet gap and a second magnet gap and wherein the step of providing a first conductor group including the step of positioning the first conductor array in the first magnet gap and the step of positioning the second conductor array in the second magnet gap.

40. The method of claim 39 wherein the step of providing a magnet component includes the step of generating magnetic flux in the first magnet gap that is substantially opposite from magnetic flux generated in the second magnet gap.

41. A method for manufacturing a stage assembly that moves a stage, the method comprising the steps of providing a motor manufactured by the method of claim 35 and connecting the motor to the stage.

42. A method for making an exposure apparatus that forms an image formed on a first object on a second object, the method comprising the steps of:
  providing an illumination system that illuminates the first object supported by a first stage to form the image on the second object; and
  connecting the motor manufactured by the method of claim 35 to the first stage as a driving force for moving the first object.

43. A method for making a device utilizing the exposure apparatus made by the method of claim 42.

44. A method for making a semiconductor wafer utilizing the exposure apparatus made by the method of claim 42.

45. The method of claim 42 wherein the step of providing an illumination system includes the step of providing an illumination source that generates an electronic beam.

46. A brushless electric motor comprising:
  a magnet component that generates a plurality of magnetic fields; and
  a conductor component comprising a first conductor group that includes (i) a first conductor array, that when electrically excited, interacts with the magnet component to generate a first force, and (ii) a second conductor array, that when electrically excited, interacts with the magnet component to generate a second force; wherein a plane of the first conductor array is approximately parallel to a plane of the second conductor array, wherein corresponding parts of the electrically excited portion of the first conductor array and the electrically excited portion of the second conductor array are positioned in magnetic fields of opposite polarity.

47. The electric motor of claim 46 wherein the first force and the second force are approximately in the same direction.

48. The electric motor of claim 47 wherein the first force is approximately equal in magnitude to the second force.

49. The electric motor of claim 46 further comprising a control system that directs a first current to the first conductor array and a second current to the second conductor array and wherein the first current is opposite in direction from the second current; and wherein the first current is approximately equal in magnitude to the second current.

50. The electric motor of claim 46 wherein the magnet component defines a first magnet gap and a second magnet gap and wherein the first conductor array is positioned in the first magnet gap and the second conductor array is positioned in the second magnet gap; and wherein the magnetic flux in the first magnet gap is substantially opposite from the magnetic flux in the second magnet gap for corresponding locations.

51. The electric motor of claim 46 wherein the plane of the first conductor array is spaced apart from the plane of the second conductor array.

52. A stage assembly including the electric motor of claim 46.

53. An exposure apparatus including the electric motor of claim 46.

54. An object on which an image has been formed by the exposure apparatus of claim 53.

55. A semiconductor wafer on which an image has been formed by the exposure apparatus of claim 53.

56. A brushless electric motor comprising:
  a magnet component that generates a plurality of magnetic fields; and a conductor component comprising a conductor component housing and a first conductor group, the conductor component housing retaining the first conductor group, the first conductor group including (i) a first conductor array, that when electrically excited, interacts with the magnet component to generate a first force and generates a first stray magnetic field, and (ii) a second conductor array, that when electrically excited, interacts with the magnet component to generate a second force and generates a second stray magnetic field, the second force being in approximately the same direction as the first force, the second stray magnetic field canceling at least a portion of the first stray magnetic field; wherein corresponding parts of the electrically excited portion of the first conductor array and the electrically excited portion of the second conductor array are positioned in magnetic fields of opposite polarity.

57. The electric motor of claim 56 wherein the second stray magnetic field cancels approximately all of the first stray magnetic field.

58. The electric motor of claim 56 wherein the second stray magnetic field cancels the first stray magnetic field by a factor of at least approximately 100.

59. The electric motor of claim 56 wherein the conductor component further comprises a Y conductor group that is retained by the conductor component housing, the Y conductor group including (i) a first Y conductor array, that when electrically excited, interacts with the magnet component to generate a first Y force and generates a first Y stray magnetic field, and (ii) a second Y conductor array, that when electrically excited, interacts with the magnet component to generate a second Y force and generates a second Y stray magnetic field, the second Y stray magnetic field canceling at least a portion of the first Y stray magnetic field; wherein current directed to the first conductor group causes the conductor component to move along a first axis and current directed to the Y conductor group causes the conductor component to move along a second axis that is orthogonal to the first axis.

60. The electric motor of claim 56 further comprising a control system that directs a first current to the first conductor array and a second current to the second conductor array, wherein the first current is opposite in direction from the second current.

61. The electric motor of claim 56 wherein the magnet component defines a first magnet gap and a second magnet gap and wherein the first conductor array is positioned in the first magnet gap and the second conductor array is positioned in the second magnet gap, wherein the magnetic flux in the first magnet gap is substantially opposite from the magnetic flux in the second magnet gap.

62. A stage assembly including the electric motor of claim 56.

63. An exposure apparatus including the electric motor of claim 56.

64. An object on which an image has been formed by the exposure apparatus of claim 63.

65. A semiconductor wafer on which an image has been formed by the exposure apparatus of claim 63.

66. A brushless electric motor comprising:
a magnet component that generates a plurality of magnetic fields; and
a conductor component comprising a first conductor group that includes (i) a first conductor array, that when electrically excited, interacts with the magnet component to generate a first force and generates a first stray magnetic field, and (ii) a second conductor array, that when electrically excited, interacts with the magnet component to generate a second force and generates a second stray magnetic field, wherein the second stray magnetic field cancels at least a portion of the first stray magnetic field; wherein a plane of the first conductor array is approximately parallel to a plane of the second conductor array, wherein corresponding parts of the electrically excited portion of the first conductor array and the electrically excited portion of the second conductor array are positioned in magnetic fields of opposite polarity.

67. The electric motor of claim 66 wherein the first stray magnetic field and the second stray magnetic field are approximately equal in magnitude.

68. The electric motor of claim 66 wherein the second stray magnetic field cancels approximately all of the first stray magnetic field.

69. The electric motor of claim 66 wherein the second stray magnetic field cancels approximately 10 percent of the first stray magnetic field at a distance of approximately 300 mm from the first conductor array.

70. The electric motor of claim 66 wherein the second stray magnetic field cancels the first stray magnetic field by a factor of at least approximately 10.

71. A brushless electric motor comprising:
a magnet component that generates a plurality of magnetic fields; and
a conductor component comprising a first conductor group and a second conductor group, wherein the first conductor group includes (i) a first conductor array that when electrically excited interacts with the magnet component to generate a first force, and (ii) a second conductor array, that when electrically excited, interacts with the magnet component to generate a second force, wherein a plane of the first conductor array is approximately parallel to a plane of the second conductor array, wherein corresponding parts of the electrically excited portion of the first conductor array and the electrically excited portion of the second conductor array are positioned in magnetic fields of opposite polarity; and wherein the second conductor group includes (i) a third conductor array, that when electrically excited, interacts with the magnet component to generate a third force and generates a third stray magnetic field, and (ii) a fourth conductor array, that when electrically excited, interacts with the magnet component to generate a fourth force and generates a fourth stray magnetic field, the fourth stray magnetic field canceling at least a portion of the third stray magnetic field.

72. A brushless electric motor comprising:
a magnet component that generates a plurality of magnetic fields; and
a conductor component comprising a first conductor group and a conductor group, wherein the first conductor group includes (i) a first conductor array, that when electrically excited, interacts with the magnet component to generate a first force, and (ii) a second conductor array, that when electrically excited, interacts with the magnet component to generate a second force, wherein a plane of the first conductor array is approximately parallel to a plane of the second conductor array, wherein corresponding parts of the electrically excited portion of the first conductor array and the electrically excited portion of the second conductor array are positioned in magnetic fields of opposite polarity; and wherein the Y conductor group includes (i) a first Y conductor array, that when electrically excited, interacts with the magnet component to generate a first Y force and generates a first Y stray magnetic field, and (ii) a second Y conductor array, that when electrically excited, interacts with the magnet component to generate a second Y force and generates a second Y stray magnetic field, the second Y stray magnetic field canceling at least a portion of the first Y stray magnetic field, wherein current directed to the first conductor group causes the conductor component to move along a first axis and current directed to the Y conductor group causes the conductor component to move along a second axis that is orthogonal to the first axis.

73. The electric motor of claim 72 wherein the conductor component includes a conductor component housing that retains the first conductor group and the Y conductor group together.

74. A brushless electric motor comprising:
a magnet component that generates a plurality of magnetic fields; and
a conductor component comprising a first conductor group that includes (i) a first conductor array, that when electrically excited, interacts with the magnet component to generate a first force, and (ii) a second conductor array, that when electrically excited, interacts with the magnet component to generate a second force; wherein corresponding parts of the electrically excited portion of the first conductor array and the electrically excited portion of the second conductor array are positioned in magnetic fields of opposite polarity.

75. The electric motor of claim 74 wherein the first force and the second force are approximately in the same direction.

76. The electric motor of claim 75 wherein the first force is approximately equal in magnitude to the second force.

* * * * *

UNITED STATES PATENT AND TRADEMARK OFFICE
CERTIFICATE OF CORRECTION

PATENT NO.    : 6,864,601 B2
DATED         : March 8, 2005
INVENTOR(S)   : Sogard It is certified that error appears in the above-identified patent and that said Letters Patent is hereby corrected as shown below:

Title page,
Item [56], References Cited, OTHER PUBLICATIONS, please include the following articles:
-- Konkola, Paul Thomas. "Magnetic Bearing Stages for Electron Beam Lithography". Thesis Document. February 1998. Massachusetts Institute of Technology.

Konkola, Paul Thomas and David L. Trumper. "Magnetic Bearing Stages for Electrom Beam Lithography." August 26-28, 2002. 8th International Symposium on Magnetic Bearings, Mito, Japan. http://web.mit.edu/konkola/www/pubs/ismb02_ptk.pdf --

Column 26,
Line 54, please insert a -- , -- after "electrically excited".

Column 30,
Line 31, please insert a -- , -- after the word "array".
Line 32, please insert a -- , -- after the word "excited".
Line 56, please insert a -- Y -- after the word "a".

Signed and Sealed this

Thirty-first Day of May, 2005

JON W. DUDAS
*Director of the United States Patent and Trademark Office*